US 12,447,415 B2

(12) United States Patent
Wellejus et al.

(10) Patent No.: US 12,447,415 B2
(45) Date of Patent: Oct. 21, 2025

(54) TWO PART TOY FIGURINE AND A TOY SYSTEM

(71) Applicant: LEGO A/S, Billund (DK)

(72) Inventors: René Christensen Wellejus, Billund (DK); Troels Nobert, Billund (DK); Henning Kirk, Billund (DK); Bjarke Holt Pedersen, Billund (DK)

(73) Assignee: LEGO A/S, Billund (DK)

( * ) Notice: Subject to any disclaimer, the term of this patent is extended or adjusted under 35 U.S.C. 154(b) by 147 days.

(21) Appl. No.: 17/793,001

(22) PCT Filed: Jan. 29, 2021

(86) PCT No.: PCT/EP2021/052062
§ 371 (c)(1),
(2) Date: Jul. 14, 2022

(87) PCT Pub. No.: WO2021/152062
PCT Pub. Date: Aug. 5, 2021

(65) Prior Publication Data
US 2023/0067137 A1    Mar. 2, 2023

(30) Foreign Application Priority Data

Jan. 29, 2020  (DK) .............................. PA202070056

(51) Int. Cl.
*A63H 3/16*     (2006.01)
*A63H 3/00*     (2006.01)
(Continued)

(52) U.S. Cl.
CPC ............... *A63H 3/16* (2013.01); *A63H 3/006* (2013.01); *A63H 3/28* (2013.01); *A63H 3/365* (2013.01)

(58) Field of Classification Search
CPC .................................. A63H 3/006; A63H 3/16
See application file for complete search history.

(56) References Cited

U.S. PATENT DOCUMENTS 4,205,482 A       6/1980   Christiansen et al.
4,348,191 A  *    9/1982   Lipsitz ................ A63F 3/00643
                                                           434/340

(Continued)

FOREIGN PATENT DOCUMENTS

CN          1697674 A      11/2005
CN        201384859 Y       1/2010
(Continued)

OTHER PUBLICATIONS

Translation KR101815425B1 (Year: 2018).*
(Continued)

*Primary Examiner* — Eugene L Kim
(74) *Attorney, Agent, or Firm* — Day Pitney LLP; George Chaclas; Anthony A. Kassas

(57) ABSTRACT

A toy figurine having a first part resembling an upper body of a character and a second part resembling a lower body of the character. The first part includes a connection element configured to mate with the mating element of the second part, forming a complete character. The first part includes two or more switches formed at an outer surface at a lower portion of the first part, and the second part includes a shell having an inner space for receiving at least a lower portion of the first part, and a number of contact pegs smaller than or identical to the number of switches in the first part. The contact pegs are capable of activating a switch, when the first part and the second part are connected, and also not activating the switch, when the first part and the second part are connected.

14 Claims, 14 Drawing Sheets

(51) Int. Cl.
*A63H 3/28* (2006.01)
*A63H 3/36* (2006.01)

(56) References Cited

U.S. PATENT DOCUMENTS

| | | | | |
|---|---|---|---|---|
| 4,820,233 | A * | 4/1989 | Weiner | A63H 5/00 |
| | | | | 446/175 |
| 4,869,701 | A | 9/1989 | Kawai et al. | |
| 4,993,983 | A * | 2/1991 | Kurita | A63H 17/26 |
| | | | | 446/272 |
| 5,190,285 | A * | 3/1993 | Levy | A63F 7/0664 |
| | | | | 463/43 |
| 5,372,511 | A | 12/1994 | Keung | |
| 5,451,178 | A * | 9/1995 | Yorozu | G09B 15/00 |
| | | | | 446/175 |
| 5,853,327 | A * | 12/1998 | Gilboa | A63F 13/26 |
| | | | | 273/237 |
| 5,906,369 | A * | 5/1999 | Brennan | A63F 3/00643 |
| | | | | 434/335 |
| 6,190,174 | B1 * | 2/2001 | Lam | A63H 33/42 |
| | | | | 463/43 |
| 6,524,159 | B1 * | 2/2003 | Kawarizadeh | A63H 5/00 |
| | | | | 446/397 |
| 6,575,810 | B1 | 6/2003 | Sohn | |
| 6,648,725 | B2 * | 11/2003 | Chan | A63H 33/3022 |
| | | | | 446/175 |
| 7,234,941 | B2 * | 6/2007 | Shuler | G09B 5/062 |
| | | | | 434/167 |
| 7,338,340 | B2 * | 3/2008 | Poesch | A63H 3/16 |
| | | | | 446/297 |
| 10,143,918 | B2 * | 12/2018 | Hodgson | A63F 13/98 |
| 10,173,142 | B2 * | 1/2019 | Chen | A63H 3/28 |
| 10,646,780 | B2 * | 5/2020 | Laulund | A63F 13/77 |
| 2001/0041495 | A1 * | 11/2001 | Chan | A63H 3/16 |
| | | | | 446/268 |
| 2002/0086612 | A1 | 7/2002 | Chan | |
| 2002/0150874 | A1 | 10/2002 | Singh et al. | |
| 2005/0215170 | A1 | 9/2005 | Poesch | |
| 2006/0030235 | A1 | 2/2006 | Brumagin et al. | |
| 2007/0087655 | A1 * | 4/2007 | Rifkin | A63H 3/52 |
| | | | | 446/268 |
| 2008/0058045 | A1 * | 3/2008 | Cortenraad | A63F 3/00643 |
| | | | | 463/9 |
| 2008/0280268 | A1 * | 11/2008 | Kelley | G09B 19/06 |
| | | | | 446/268 |
| 2009/0264200 | A1 * | 10/2009 | Schwartz | A63F 13/12 |
| | | | | 463/40 |
| 2009/0315258 | A1 * | 12/2009 | Wallace | A63F 3/00643 |
| | | | | 273/238 |
| 2011/0021108 | A1 * | 1/2011 | Le | A63H 13/00 |
| | | | | 446/298 |
| 2014/0273714 | A1 * | 9/2014 | Leyland | A63H 33/26 |
| | | | | 336/105 |
| 2015/0258435 | A1 * | 9/2015 | Zhang | A63F 13/235 |
| | | | | 463/36 |
| 2019/0009181 | A1 | 1/2019 | Kroyan et al. | |
| 2019/0030452 | A1 | 1/2019 | Fassbender et al. | |
| 2019/0038987 | A1 | 2/2019 | Smith et al. | |
| 2021/0093979 | A1 | 4/2021 | Manovi et al. | |
| 2021/0366308 | A1 * | 11/2021 | Tsuchiya | G09B 5/06 |

FOREIGN PATENT DOCUMENTS

| | | |
|---|---|---|
| CN | 201565130 U | 9/2010 |
| CN | 203989880 U | 12/2014 |
| CN | 204395435 U | 6/2015 |
| CN | 207412751 U | 5/2018 |
| CN | 208799772 U | 4/2019 |
| CN | 112449611 A | 3/2021 |
| CN | 113356708 A | 9/2021 |
| KR | 101815425 B1 * | 1/2018 |
| WO | WO2001097937 A1 | 12/2001 |
| WO | WO-2004058370 A1 * | 7/2004 ............... A63H 3/16 |

OTHER PUBLICATIONS

International Search Report with Written Opinion issued in corresponding International Patent Application No. PCT/EP2021/052062, mailed Oct. 5, 2021, 8 pages.

DK Search Report in corresponding Application No. PA 2020 70056, mailed Aug. 25, 2020, 4 pages.

CN Office Action corresponding to U.S. Appl. No. 17/793,001, dated Sep. 18, 2023, 7 pages (With GB Translation).

* cited by examiner

TWO PART TOY FIGURINE AND A TOY SYSTEM

CROSS-REFERENCE TO RELATED APPLICATIONS

This application is a U.S. national stage application under 35 U.S.C. 371 of co-pending International Application No. PCT/CN2021/052062 filed on Jan. 29, 2021, which in turn claims priority to Danish Patent Application PA202070056 filed on Jan. 29, 2020, the contents of each are incorporated by reference herein in their entirety for any purpose whatsoever.

FIELD OF THE DISCLOSURE

The present disclosure relates to a two part toy figurine. More particular the disclosure relates to a two part, interactive, toy figurine having electronic characteristics, and comprising a first part and a second part, where the first part includes a first subset of limbs of the total set of limbs or the assembled figurine, and where the second part includes a second subset of the total set of limbs.

The present disclosure further relates to interactive toys.

BACKGROUND

US 2019/0030452 A1 discloses a toy figure for plying music or spoken stories.

It generally remains desirable to provide interactive toys that provide an entertaining play experience.

It is further generally desirable to provide toys at relatively low costs.

It is further desirable to provide a toy that provides an easy-to-use, yet entertaining and versatile interaction with the toy.

SUMMARY

The objects of the disclosure are—in a first aspect—achieved by a toy figurine, comprising
  a toy figurine first part resembling an upper body of a character; and
  a toy figurine second part resembling a lower body part of the character,
  the toy figurine first part comprising connection means, and the toy figurine second part comprising complementary connection means, the toy figurine first part and the toy figurine second part together forming the complete character of the toy figurine, when connected to each other,
  the toy figurine first part comprising two or more switches formed in a first array of switches, the two or more switches being formed at an outer surface at a lower portion of the toy figurine first part,
  the toy figurine second part comprising a shell having an inner space configured for receiving at least a lower portion of the toy figurine first part, and a second array comprising a combination of contact pegs being configured for activating a switch, when the toy figurine first part and the toy figurine second part are connected, and voids or contact pegs being configured for not activating a switch, when the toy figurine first part and the toy figurine second part are connected,
  where the second array is formed in a lower part of the inner space.

Preferably, the complementary connection means are of a type allowing releasable connection of the first part and the second part.

In an embodiment, the switches of the first array are formed in a line at regularly spaced positions, and where contact pegs of the second array are aligned with the positions of the switches.

In a further embodiment, the first array comprises six switches formed along a line, and wherein, the second array comprises a combination of x contact pegs configured for activating a switch, where x belongs to an interval of integers between 0 and 6, and 6-x voids or voids or contact pegs being configured for not activating a switch.

In an embodiment, the toy figurine first part comprises at least one electronic output component and a processor,
  wherein the processor comprises a memory, in which a number of character behaviour patterns are stored,
  wherein the processor is electronically connected to the at least one electronic output component, and to said switches;
  wherein the processor, dependent on a combination of contact pegs configured for activating a switch and contact pegs not configured for activating a switch is configured to select a character behaviour pattern, and configured for using the character behaviour pattern to provide sound and/or visual outputs via said at least one electronic output component.

In a further embodiment, the at least one electronic output component is a digital screen and/or a loudspeaker.

In a further embodiment, the toy figurine first part comprises a sensor for detecting movement of the toy figurine,
  wherein the sensor is electronically connected to the processor, and
  wherein the processor is configured for providing a sound and/or visual output via the at least one electronic output component in response to a movement of the toy figurine sensed by said sensor.

In a further embodiment, the toy figurine first part comprises a reader for detecting markers in a proximity of the toy figurine,
  wherein the reader is electronically connected to the processor, and
  wherein the processor is configured for providing a sound and/or visual output via the at least one electronic output component in response to a movement of the toy figurine sensed by said reader.

In a further embodiment, the reader for detecting markers in a proximity of the toy figurine is formed in a bottom surface of the toy figurine first part, and where an opening is arranged through a bottom wall of the shell of the toy figurine second part.

In a further embodiment, the toy figurine first part comprises first connection means extending downward from the bottom surface thereof,
  wherein the first connection means are configured for cooperating with a rim of the opening through the bottom wall of the shell of the toy figurine second part, and
  wherein the first connection means surrounds the reader formed in a bottom surface of the toy figurine first part.

The objects of the disclosure may—in a second aspect—be achieved by toy system comprising a toy figurine according to any one of the embodiment of the first aspect of the disclosure.

In an embodiment, the toy system comprises at least one toy figurine first part having two or more switches, and two or more toy figurine second parts having different combinations of activating contact pegs.

In a further embodiment 10, the toy system further comprises one or more construction elements attachable to the toy figurine via fifth connection means formed on the toy figurine.

In a further embodiment 10, the toy system comprises one or more toy construction elements, at least a subset of which comprises markers, the toy construction elements forming part of a physical play environment.

It should be emphasized that the term "comprises/comprising/comprised of" when used in this specification is taken to specify the presence of stated features, integers, steps or components but does not preclude the presence or addition of one or more other features, integers, steps, components or groups thereof.

It should be appreciated that the subject technology can be implemented and utilized in numerous ways, including without limitation as a process, an apparatus, a system, a device, a method for applications now known and later developed. These and other unique features of the system disclosed herein will become more readily apparent from the following description and the accompanying drawings.

BRIEF DESCRIPTION OF THE DRAWINGS

In the following, the disclosure will be described in greater detail with reference to embodiments shown by the enclosed figures. It should be emphasized that the embodiments shown are used for example purposes only and should not be used to limit the scope of the disclosure.

DETAILED DESCRIPTION

Figure 1:
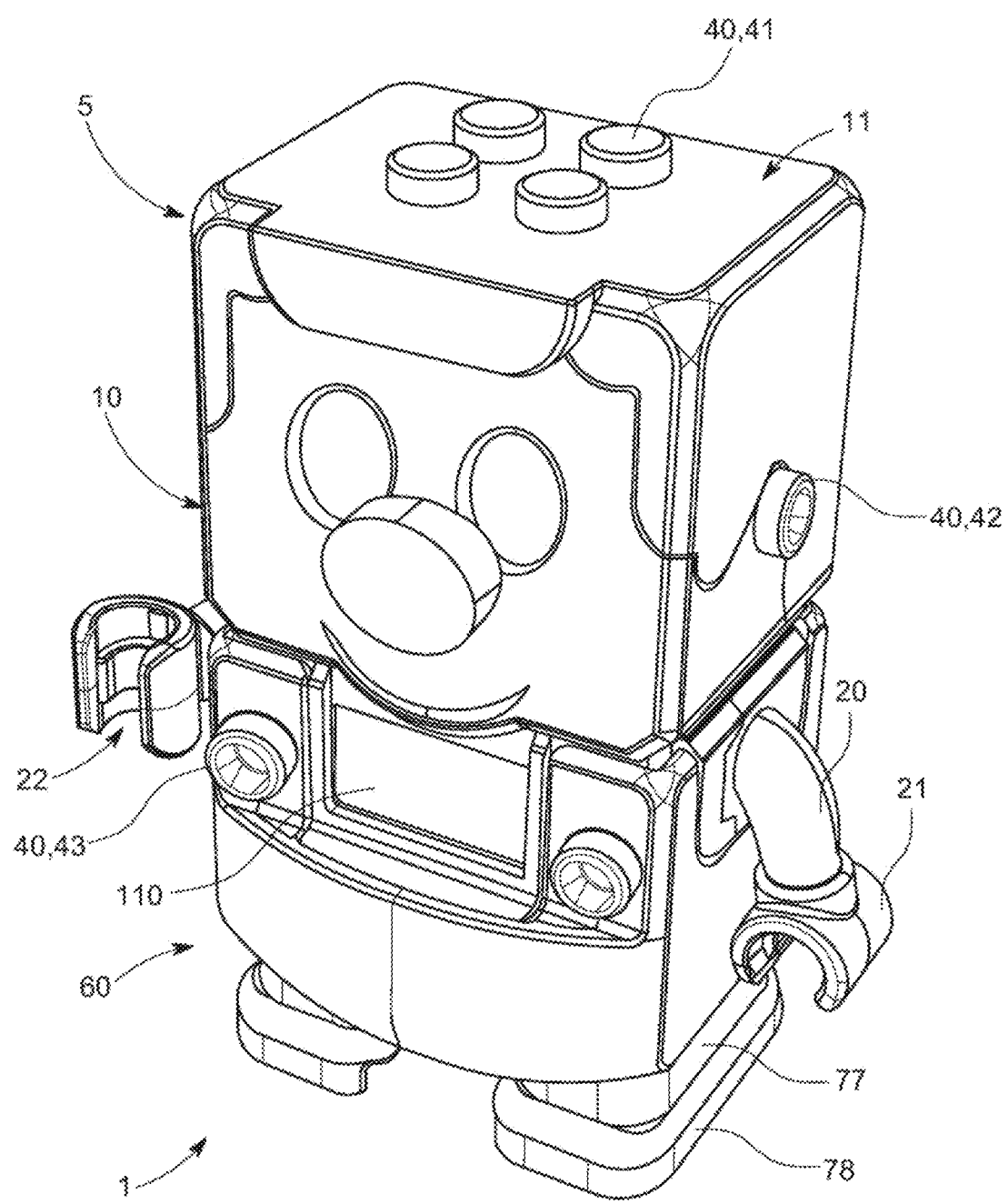
FIG. 1, in a perspective view, shows a two part toy figurine according to the disclosure in an assembled state.
Figure 2:
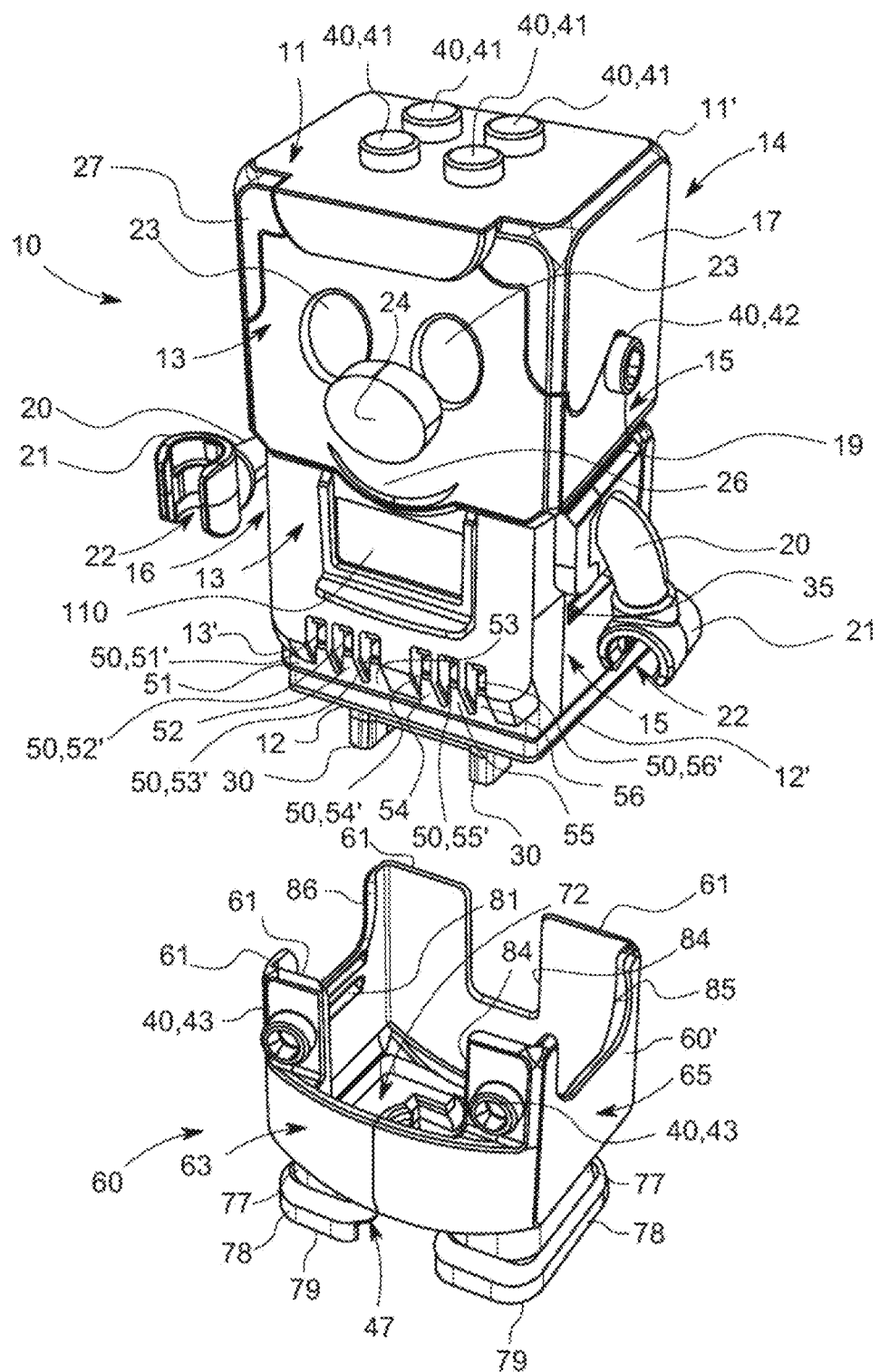
FIG. 2, in a perspective view, shows the two part toy figurine of FIG. 1 in a state where a first and a second part of the two part figurine are removed from each other.

FIG. 1, in a perspective view, shows a two part toy figurine, or toy figurine 5 according to an embodiment of the disclosure. The toy figurine 5 comprises as toy figurine first part 10 and a toy figurine second part 60. The toy figurine first part 10 may also be referred to simply as first part 10. The toy figurine second part 60 may also be referred to simply as second part 60. The first part 10 and the second part 60 are configured to be releasably connected to each other to form a toy figurine 5, which in FIG. 1 is shown in an assembled state, where the first part 10 and the second part 60 are connected to each other. In FIG. 2 the toy figurine 5 is shown in a disassembled state, where the first part 10 and the second part have been disconnected or disassembled from each other.

As shown, the toy figurine 5 is of a type resembling a character such as human being, an animal, a toy human being, a toy animal or the like.

Further, the toy figurine 5 is of a type is of a type comprising electronic components to enhance character traits relating to the character, which the toy figurine 5 is made to resemble. Such character traits may be sounds, music, tactile e.g. vibration patterns, and light such as flashing lights etc. For this purpose the toy figurine 5 is equipped with one or more electronic output components, such as one or more loud speaker, one or vibration devices, one or more light sources (such as LED), etc. Examples of such electronic output components will be described below. For example, in an embodiment, and as shown in the figures, the toy figurine 5 may comprise a digital screen 110. In preferred embodiment the electronic output components are provided in the first part 10.

The toy figurine 5 is further equipped with a suitable electronic controller (not shown) (a processor) electronically connected with the one or more electronic components for controlling the same, e.g. via a suitable wiring. In preferred embodiments the electronic controller is provided in the first part 10.

Further, the toy figurine 5 may be equipped with one or more sensors, such as proximity sensors, vibration sensors, location sensors, sensors for detecting movement of the figurine, readers for detecting markers in a proximity of the toy figurine, cameras, etc. Examples of such electronic components in the form of sensors will be described below. The one or more sensors may be connected to the electronic controller via suitable electrical connections, e.g. wiring. In some embodiments, one or more sensors are provided in the first part 10. In an embodiment, the above mentioned digital screen may be a touch screen, and thereby be configured for both providing an output and for receiving an input from a user.

Further, the toy figurine 5 may comprise one or more communication devices for communicating with other entities such as other similar toy figurines, computers, cell phones, etc. Such communication devices may comprise ports and/or wireless communication devices, such as blue tooth, Wi-Fi etc. Examples of such electronic components in the form of communication devices will be described below. The one or more communication devices may be electronically connected to—and controlled by—the above mentioned electronic controller. In some embodiments, one or more such communication devices are provided in the first part 10.

Further, the toy figurine 5 may comprise a power source (not shown), such as one or more electric batteries. The power source is configured for powering the one or more electronic output components, the one or more sensors, the one more communication devices and the electronic controller. For this purpose, the one or more batteries is/are connected via suitable electronic circuitry, e.g. wiring. In preferred embodiments the power source is provided in the first part 10.

The first part 10 comprises a top end 11', a top surface 11, a bottom end 12' and a bottom surface 12, and a main portion extending between the top surface 11 and the bottom surface 12, the main portion providing a housing 10' for one or more of the electrical output devices, the processor, the digital screen, and the sensors discussed above.

The main portion or housing 10' comprises a first/upper portion 17 resembling a head of the character, and a second/lower portion 18 resembling a body of the character which the toy figurine 5 is intended to look like/represent.

Further, the main portion or housing 10' of the first toy figurine 5 is essentially box shaped. The first/upper portion 17 resembling a head and the second/lower portion 18 resembling a body may be visually distinguishable at least by a circumferential indentation 19 surrounding the housing 10', and resembling a neck of the character which the toy figurine 5 is intended to look like/represent.

The box shape of the housing 10' of the toy figurine first part 10 comprises a front surface 13, a back or rear surface 14 parallel with and opposing the front surface 13, and two parallel and opposed side surfaces 15, 16 connected to the front surface and the back surface, and perpendicularly thereto. At the upper end 11' the front surface 13, the back or rear surface 14, and the side surfaces 15, 16 are connected to the upper surface 11, and at the lower end 12', the front surface 13, the back or rear surface 14, and the side surfaces 15, 16 are connected to the lower/bottom surface 12 to formed the essentially box shaped housing 10'.

To make the appearance of a specific character, the housing 10' may be provided with ornamentations representative of certain characteristic features of the character, which the toy figurine 5 is supposed to resemble. The ornamentation may be provided e.g. by a colouring, or by integrated reliefs formed with the housing 10' or parts thereof, or a combination thereof.

As shown in FIGS. 1-6, such ornamentations may comprise a set of eyes 23, a nose 24, a mouth 26 and hair 27. In the embodiment shown in FIGS. 1-6, the mentioned features are shown as being formed as reliefs in the housing 10'.

Figure 7:
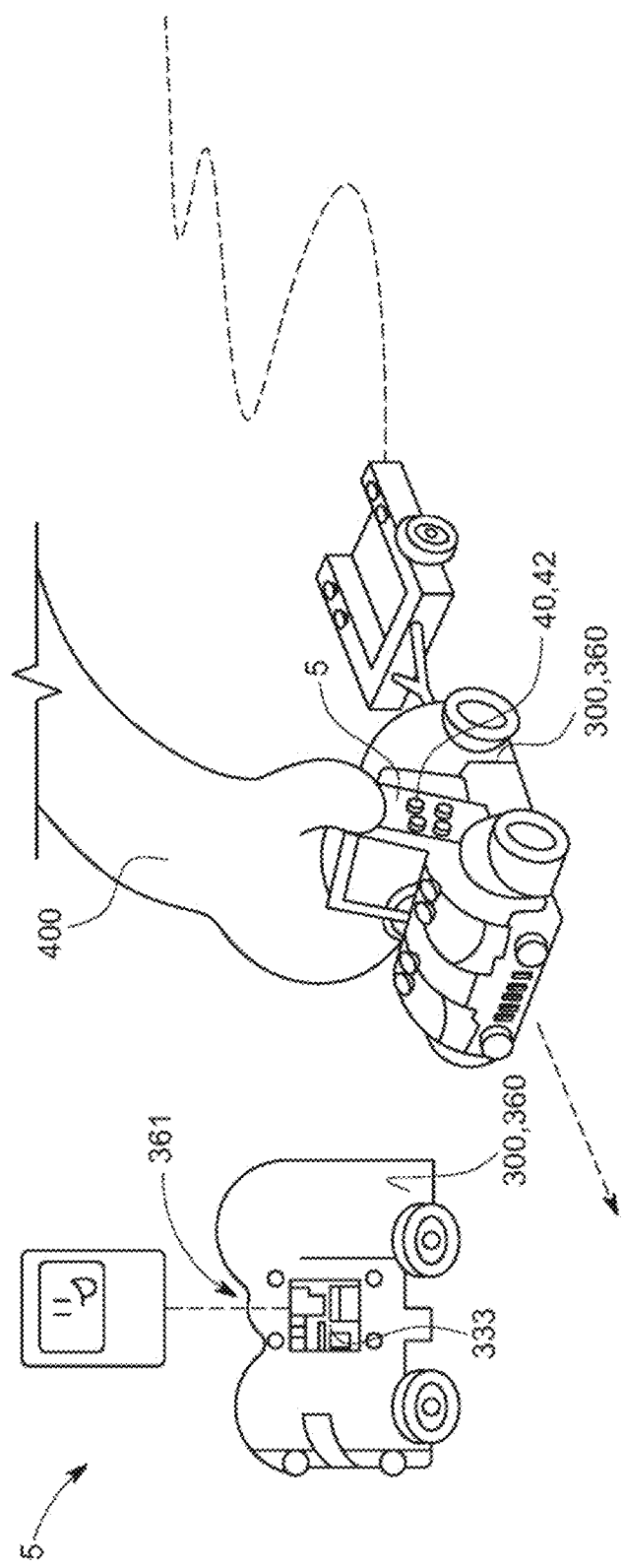
FIG. 7, in a perspective view, shows a toy system with two part toy figurine according to the disclosure in combination with a toy construction element.
Figure 8:
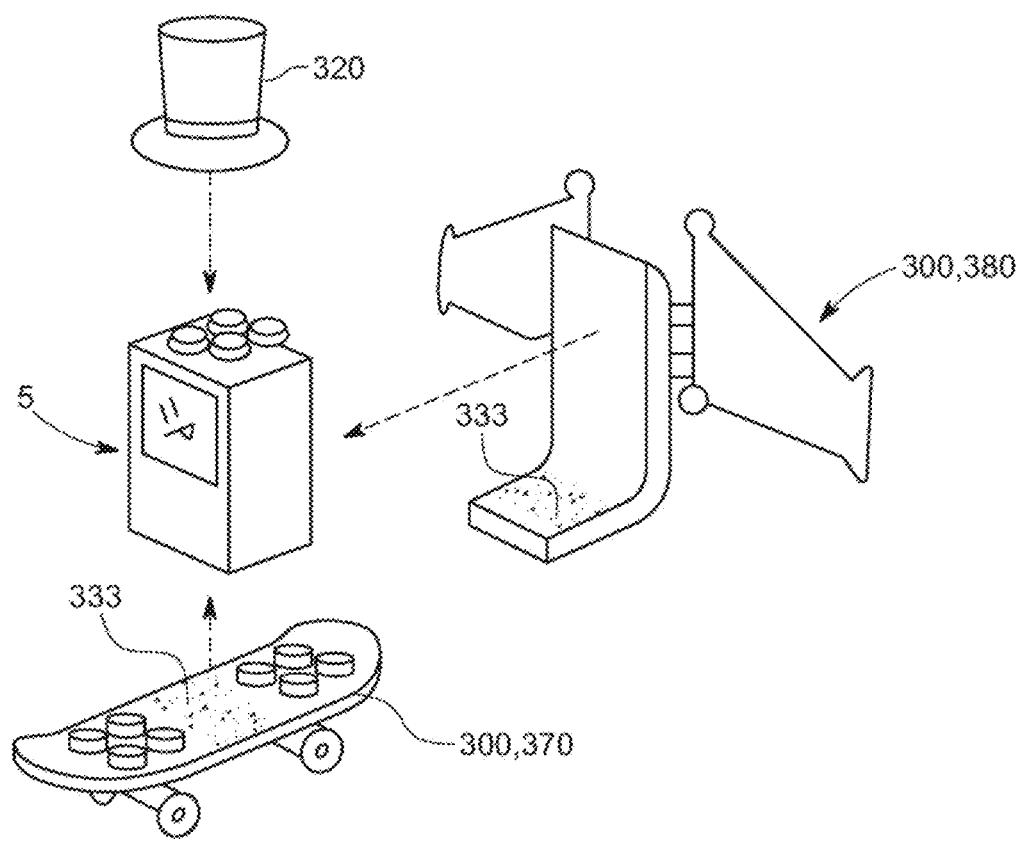
FIG. 8, in an exploded perspective view, shows a two part toy figurine according to the disclosure, in combination with two different toy construction elements.
Figure 9:
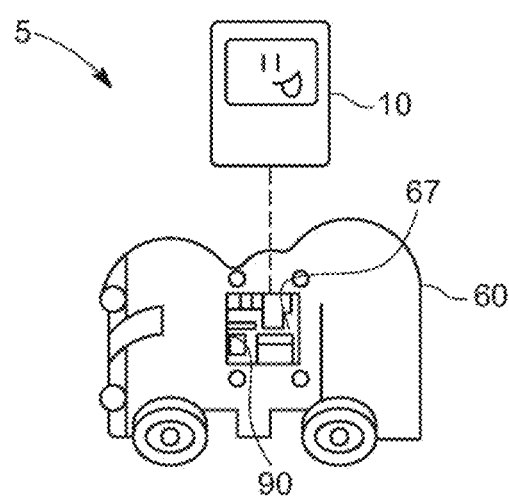
FIG. 9, in a perspective view, shows a toy figurine comprising a toy figurine first part and a toy figurine second part according to another embodiment of the disclosure.
Figure 10:
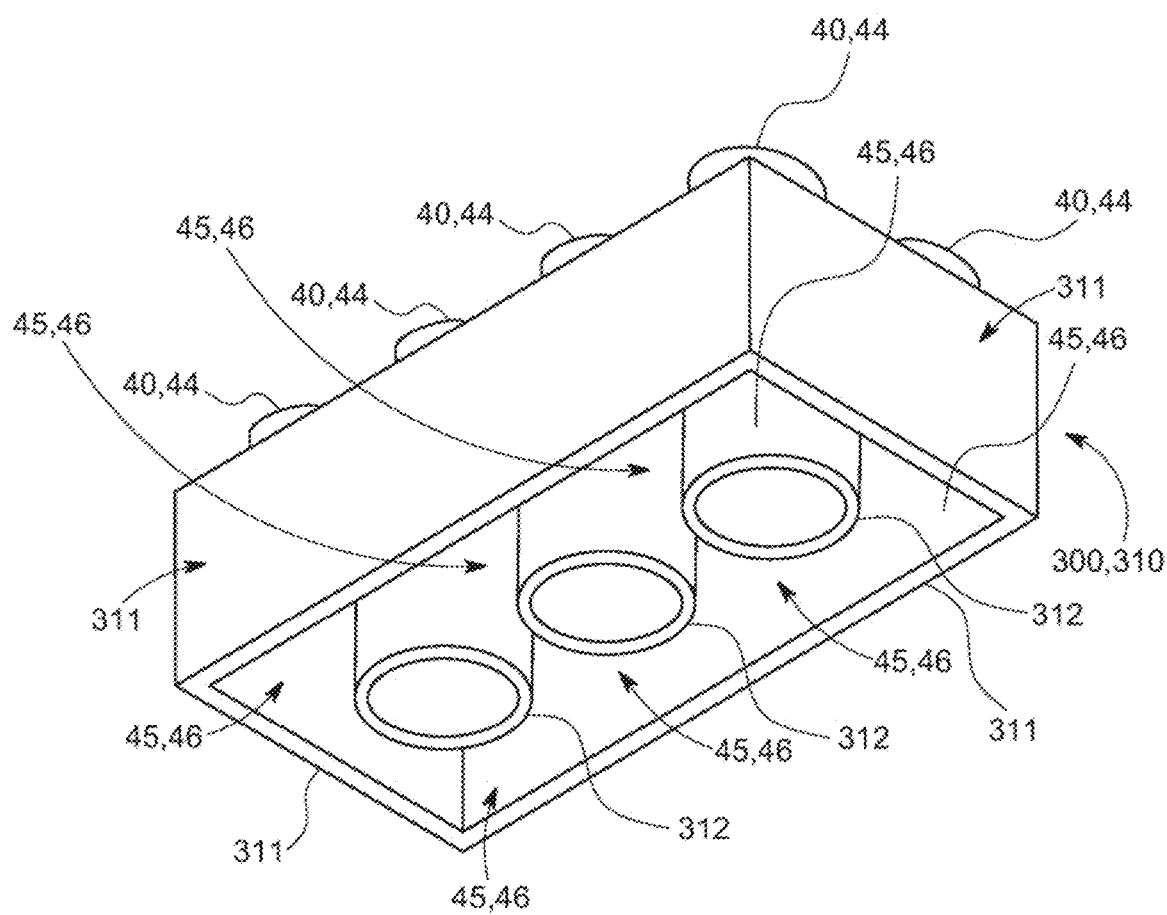
FIG. 10, in a perspective view, shows a building block, which may form part of a toy system according to an aspect of the disclosure.

In the embodiments shown in FIGS. 7, 8 and 9, facial traits of a character, like mouth and eyes are indicated as being represented on a digital screen formed at the outer surface of the front surface of the toy figurine 5.

Combinations of representation by colouring, reliefs and screens may be utilized in various embodiments of the disclosure. For example, the set of eyes 23 shown in the toy figurine embodiment of FIGS. 1-6 may be reliefs provided with digital screens. In such embodiments, the digital screens forming the eyes 23 could be used to show various facial expressions, such a winking one eye, for example in response to a stimulus to one of the sensors mentioned above.

In further embodiment, and as shown in FIGS. 1-6, the first toy figurine part 10 may be provide with an arm 20 extending from each of the two side surfaces 15, 16. The arms 20 may be rotationally connected to the housing 10'. Further, each of the arms may be provided with a hand 21. The hands 21 may be rotationally connected to the arm 20.

The hands 21 are preferably, and as shown formed as claw, with two flanges formed encircling a cylindrical space. The claw formed by the two flanges of the hand 21 thereby may form a connector 22 configured for connecting to other construction toy parts (not shown) having at least portions that are cylindrical and dimensioned to cooperate with the connector 22 by resilience of the two flanges of the claw forming the hand 21.

At the bottom surface 12 of the housing 10', the toy figurine first part 10 is provided with first connection means 30, the first connection means 30 being configured for cooperating with second connection means 80, formed in the toy figurine second part 60.

The first connection means 30, may—as shown in FIGS. 2 and 3A-E be formed as connector studs or pegs 31, 32, 33, 34 provided on and extending downwardly from the lower/bottom surface, in a direction perpendicular to a plane defined by the lower/bottom surface 12 of the housing 10' of the toy figurine first part 10.

As shown in FIGS. 2 and 3A-E, there may be formed four such resilient connector studs 31, 32, 33, 34 extending from the bottom surface 12.

The connector studs or pegs 31, 32, 33, 34 may in not shown embodiments cooperate with corresponding openings (not shown) forming the second connection means 80 on the toy figurine second part 60. Alternatively, the connector studs or pegs 31, 32, 33, 34 may cooperate with a rim 68 of and central opening of bottom surface 63 of the toy figurine second part 60 as will be explained below. In such embodiments, the first and second connection means may serve more to position the toy figurine first part 10 and the toy figurine second part 60 correctly relative to each other, the first part 10 and the second part 60 in these embodiment being formed with respective third and fourth corresponding connection means 35, 81, e.g. in the form of a snap connection, in order to provide a releasable connection between the parts 10, 60.

In other embodiment the connector studs 31, 32, 33, 34 may be formed as resilient protrusions. Also in these embodiments they may cooperate with corresponding openings (not shown) formed in a portion, such as the lower/bottom surface 63 of the toy figurine second part 60. The resilient connector studs 31, 32, 33, 34 may be provided with a small barb formed at the lower end of the resilient connector studs 31, 32, 33, 34, and configured for connecting/grasping to an edge of the openings or a rim forming part of the second connecting means 80 formed in the toy figurine second part 60, as will be described in more detail below.

Figure 3A:
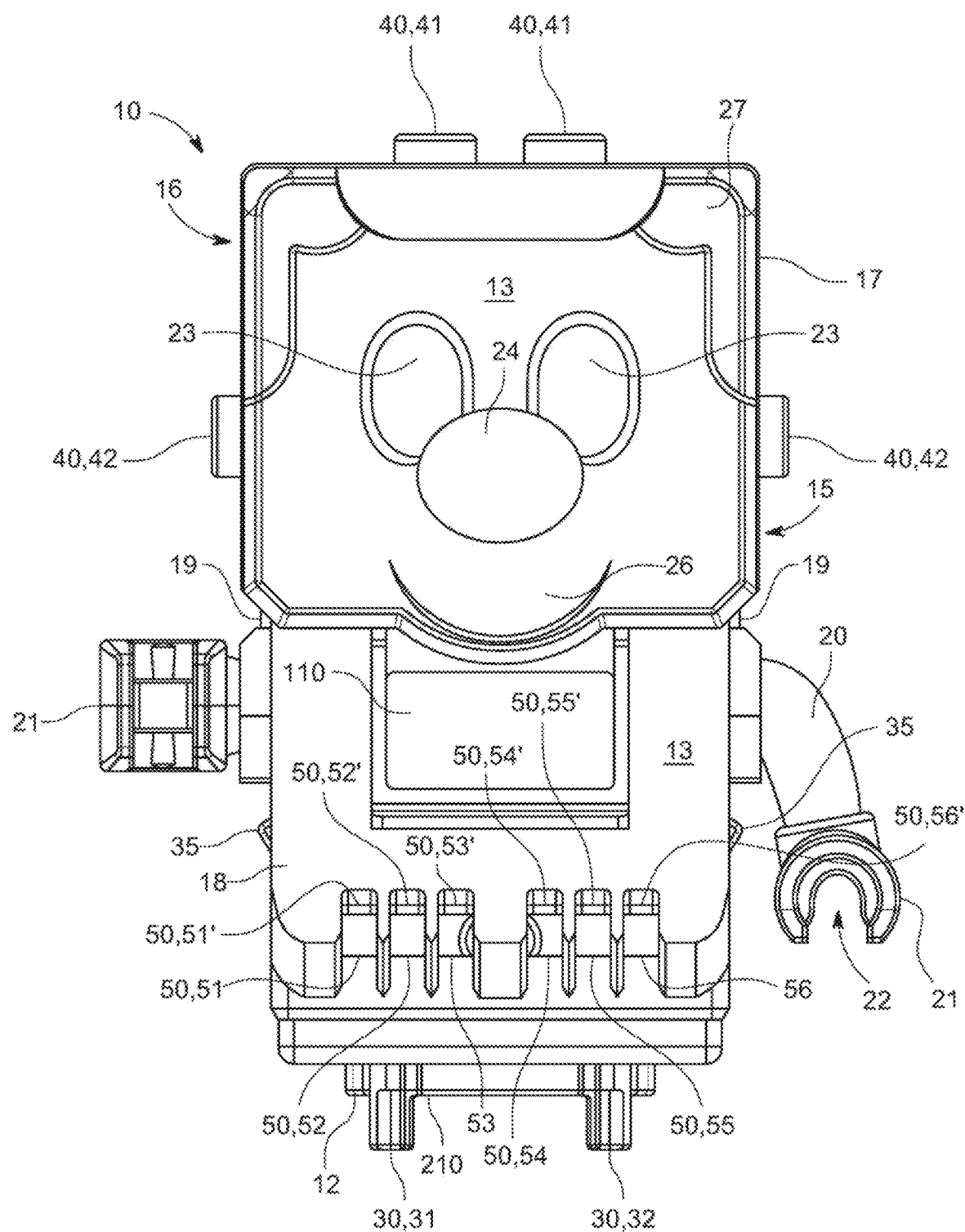
FIG. 3A, in a front view, shows a first part of the toy figurine in FIG. 2.
Figure 3B:
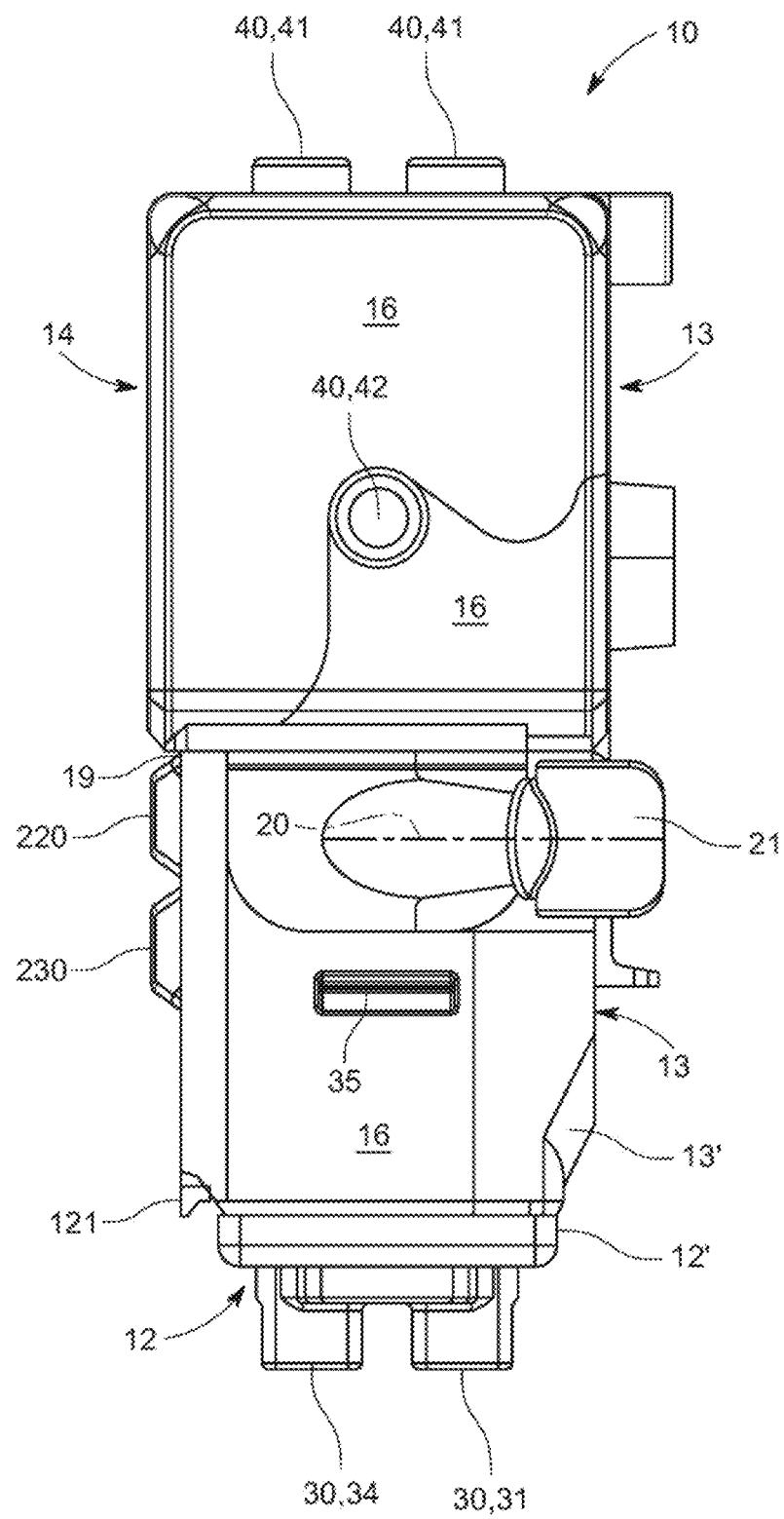
FIG. 3B is a side view of the first part of the toy figurine in FIG. 3A.
Figure 3C:
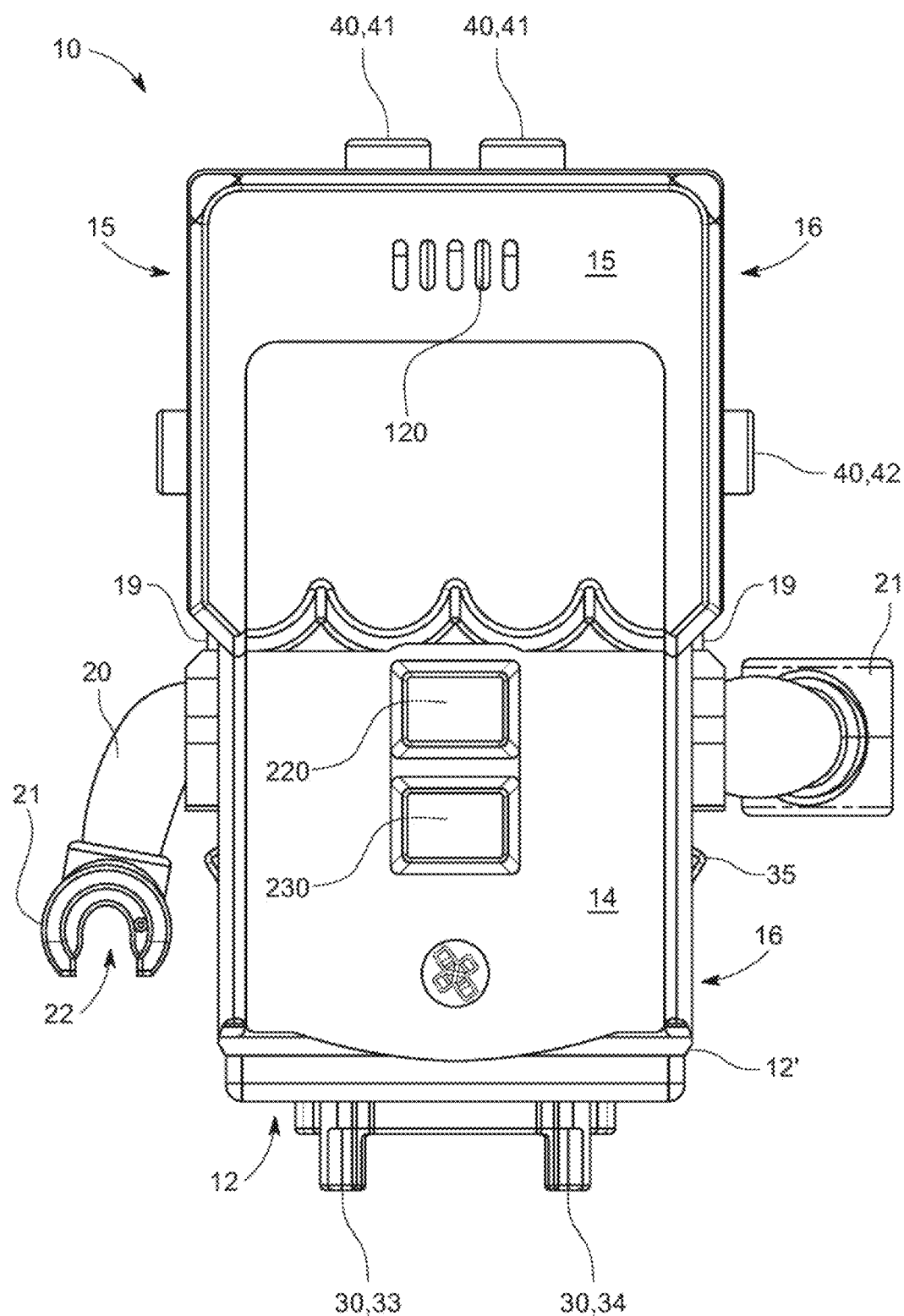
FIG. 3C is rear view of the first part of the toy figurine of FIG. 3A.
Figure 3D:
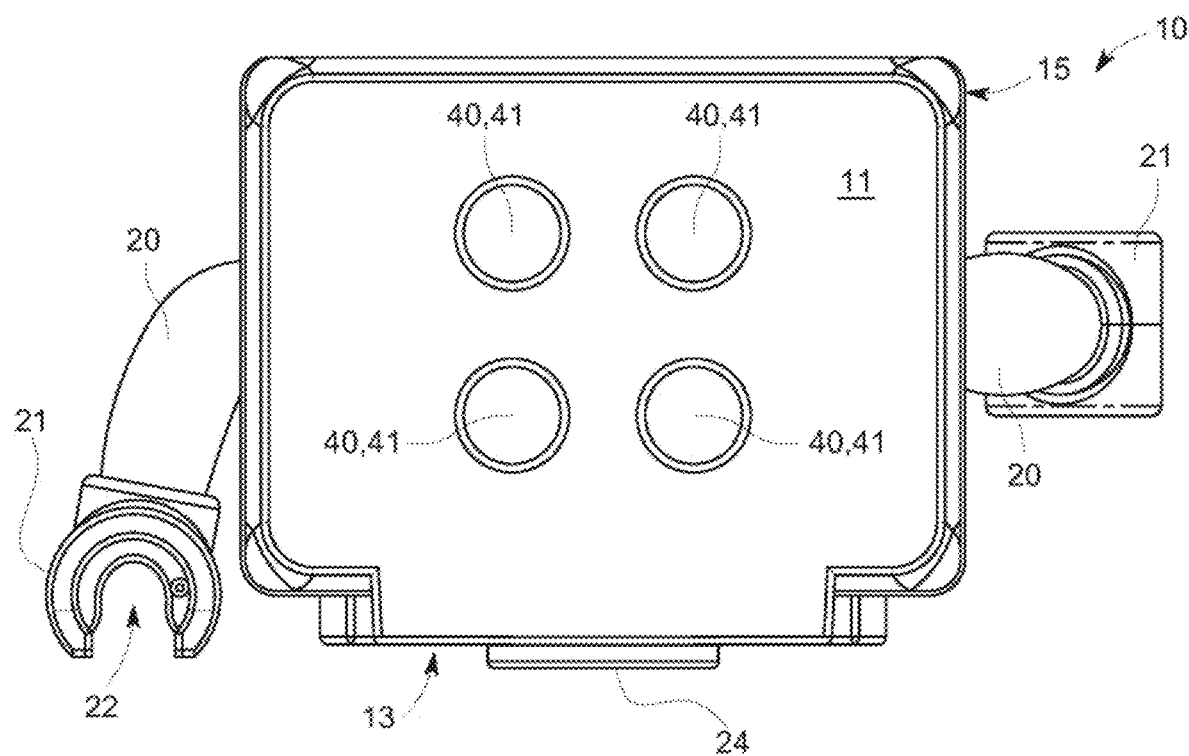
FIG. 3D is top view of the first part of the toy figurine of FIG. 3A.
Figure 4A:
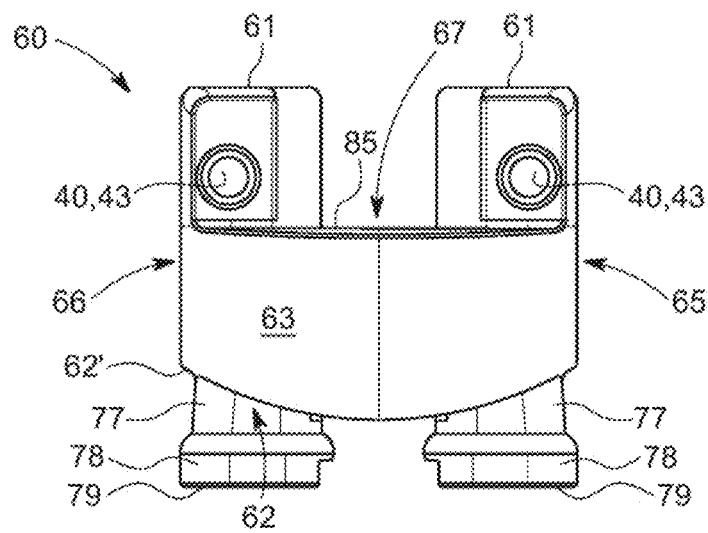
FIG. 4A, in a front view, shows a second part of the toy figurine in FIG. 2.
Figure 4B:
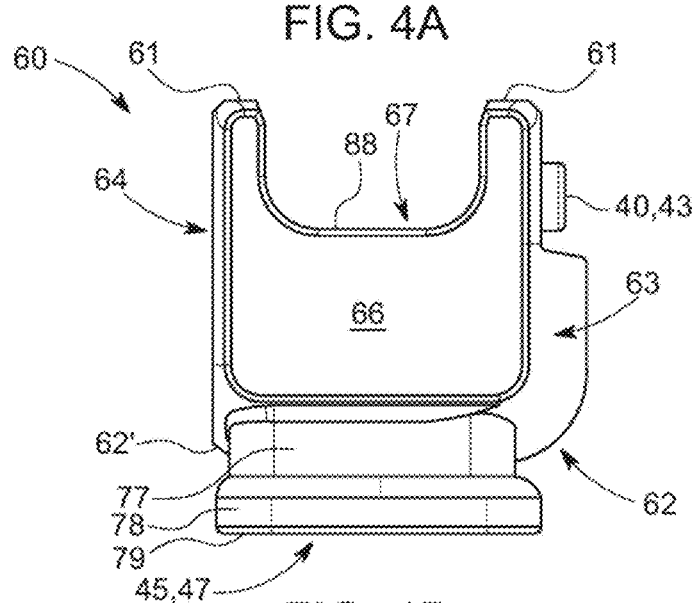
FIG. 4B is a side view of the second part of the toy figurine of FIG. 4A.
Figure 4C:
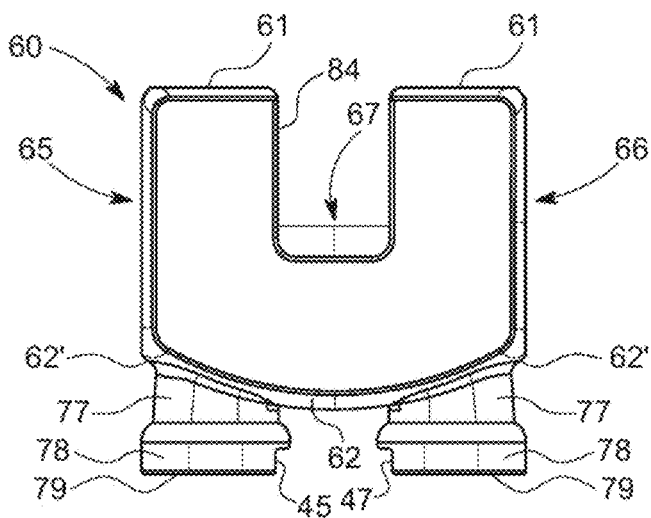
FIG. 4C is a rear view of the second part of the toy figurine of FIG. 4A.
Figure 4D:
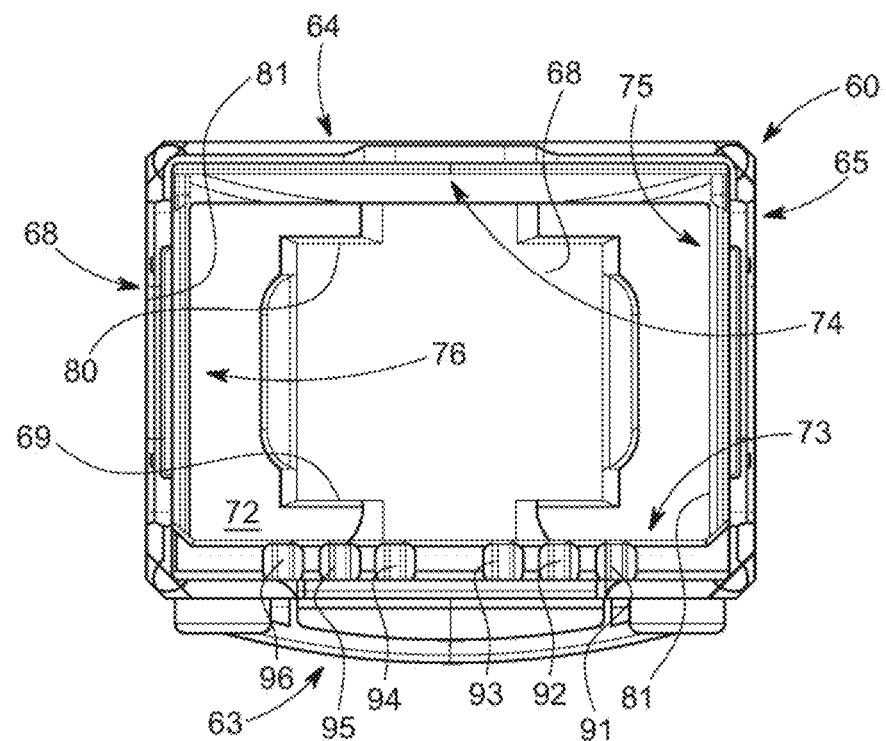
FIG. 4D is a top view of the second part of the toy figurine of FIG. 4A.
Figure 4E:
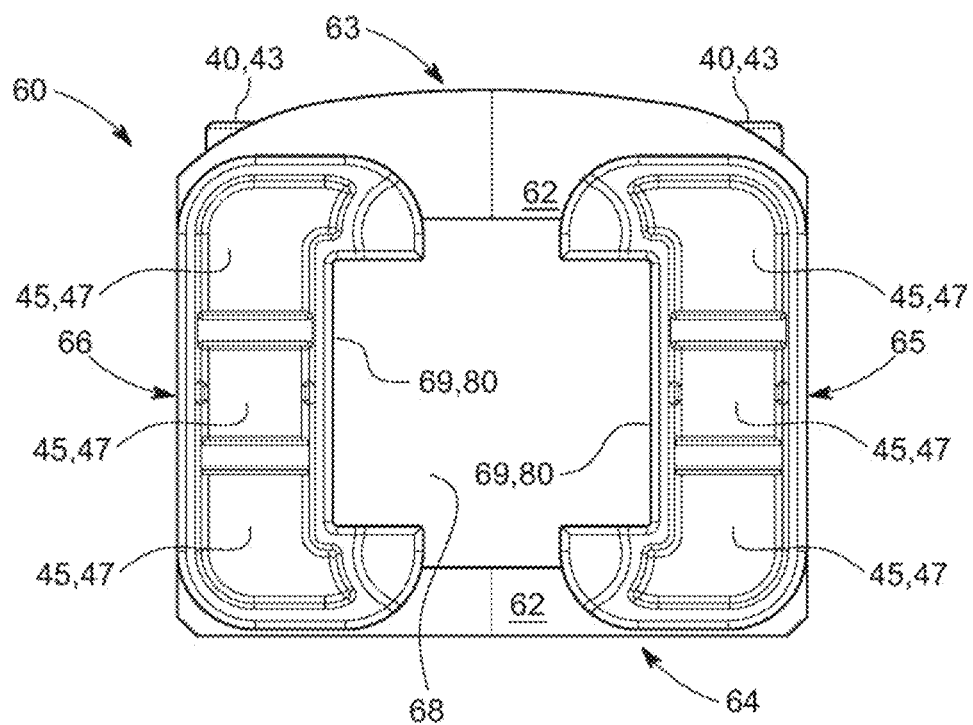
FIG. 4E is a bottom view of the second part of the toy figurine of FIG. 4A.
Figure 6:
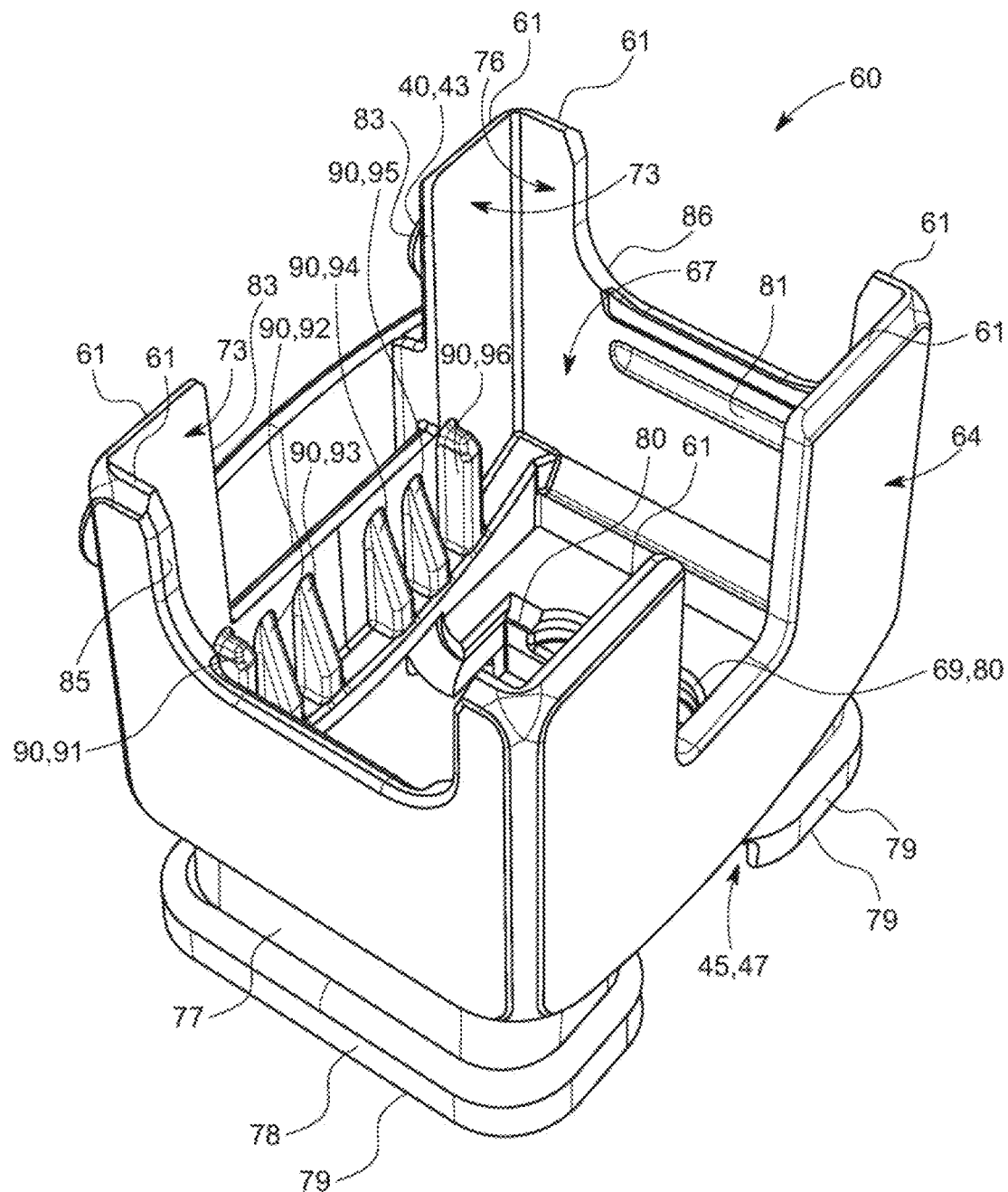
FIG. 6, in a perspective view, shows details of the second part of the toy figurine.

As briefly mentioned above, in some embodiment and as shown in FIGS. 2 and 3A-C, E the toy figurine first part 20 may—on each of the outer side surfaces 15, 16—be provided with third connection means 35 configured for cooperating with fourth connection means 81, see e.g. FIGS. 2, 4D, and 6, on the inner side surfaces 75, 76 of the toy figurine second part 60. The third connection means 35 are preferably formed as one elongate flange on each of the two outwardly facing side surfaces 15 and 16 of the toy figurine first part 10. The elongate flange on each side surface 15, 16 is preferably formed horizontally.

As shown in e.g. FIG. 2, the toy figurine first part 10 may be provided fifth connectors/connection means 40, e.g. in the form of knobs 41, 42, 43.

As shown in FIG. 2 there may e.g. be formed four knobs 41 on the upper/top surface 11 of the housing 10' and protruding therefrom. As shown the four knobs 41 are arranged in a 2×2 array.

Thereby, the fifth connection means/knobs 41 may be used for connecting the first toy figurine part 10 to another toy construction element 300, for example a hat 320 as shown in FIG. 8. For this purpose, the other toy construction element 300 may be provided with sixth connection means 45, for example in the form of corresponding indentations (not shown in FIG. 8) cooperating with the knobs 41. These indentations on the hat 320 may be similar to indentations 46 as shown in FIG. 9, and described in further detail below.

FIG. 9 shows an example of toy construction element 300 in the form of a toy building block 310, known in the art. The shown toy building block 310 is box shaped having four sides 311 and a top wall (not visible in FIG. 9). Thereby, the five walls/sides defines an open box shape construction with an internal space.

Eight knobs 44, five of which may be identified in FIG. 9, are arranged in a regular 2×4 grid at the top surface of the top wall of the building block 310.

The toy building block 310 is open at the bottom. Extending downwards from a (not shown) downwardly facing surface of the top wall, the toy building block 310 is provided with three cylindrical protrusions 312, arranged along a centerline of the toy building block 310, and arranged with their longitudinal axes parallel to the plane of the side wall 311, and perpendicular to the top wall. The three cylindrical protrusions 312 divide the open bottom and the inner space of the toy building block 310 into eight indentations 46 formed in a regular 2×4 grid, and corresponding to the 2×4 grid of knops 46 extending from the upwardly facing surface of the top wall of the toy building block 310. Thereby, two identical toy building blocks 310 or toy building blocks with other arrays of knobs 44 and indentations 46 may attach to each other as known in the art. The toy building block 310 is described merely as example of a toy construction element 300 that may form part of a system 1 according to an aspect of the disclosure, and as example of an toy construction element 300 attachable to the toy figurine 5 via one or more fifth connection means 40, such as knobs. It will however be appreciated that such toy construction elements 300 may take other shapes and dimensions and vary in array dimensions and height of toy building blocks (from bottom to upper surface of top wall). However, preferably such toy construction elements 300 has either fifth connection means 40 (such as knobs 41, 42, 43, 44) or corresponding sixth connection means 45 (such as indentations 45), or both.

Returning now to FIG. 2, each of the side surfaces 15, 16 of the toy figurine first part 10 may be provided with one or more fifth connection means 40. The one or more fifth connection means 40, e.g. in the form of knobs, may be used to connect other toy construction elements 300 as suggested above. As shown in e.g. FIG. 2, each of the side surfaces 15, 16 of the toy figurine first part 10 may be provided with a single knob 42 protruding from the side surface 15, 16. The single knob may be used to connect other toy construction elements 300 as suggested above. However—as shown in FIG. 2—the single knob 42 on each side surface 15, 16 may be positioned on the side surface 15, 16 such that it may resemble an ear of the character, which the toy figurine 5 is intended to resemble. As such, the knob 42 would be ornamental, but it would provide an ornamental feature with the technical capability of attaching a toy construction element 300.

Now referring to FIGS. 2 and 4A-E, the toy figurine 5 as mentioned also comprises a toy figurine second part 60 realizably attachable to the toy figurine first part 10.

The toy figurine second part 60 comprises a shell 60' extending between a top or upper edge 61 and a bottom/lower wall 62 formed at a bottom/lower end 62' of the of toy figurine second part 60, see e.g. FIG. 4C.

Further, the shell 60' of the toy figurine second part 60 comprises a front surface 63, a back/rear surface 64 formed parallel to and opposed to the front surface 63 and extending perpendicularly upwardly from the lower/bottom wall 62 of the toy figurine second part 60. Further, the shell 60' of the toy figurine second part 60 comprises two parallelly arranged and opposed side walls 65, 66, also extending perpendicularly upward from the lower/bottom surface 62 of the toy figurine second part 60, and connected to the front and back surfaces 63, 64. Thereby the shell 60' basically is shaped like a box with one open side. An internal space 67 is defined between internal or inner surfaces 72, 73, 74, 75, 76 corresponding to the bottom wall 62, the front surface 63, the back surface 64, and the side surfaces 65, 66 of the toy figurine second part 60, respectively.

The toy figurine second part 60 is configured such that at least a lower part of the second portion 17 of the housing 10' of the toy figurine first part 10 may be received in the internal space 67 formed between the inner surfaces 72, 73, 74, 75, 76 of the toy figurine second part 60.

The inner surface 72 of the bottom wall 62 is sized and arranged to cooperate with and abut the bottom surface 12 of the toy figurine first part 10. The inner surface 73 of the front surface 63 is sized and arranged to cooperate with and abut the front surface 13 of the toy figurine first part 10. The inner surface 74 of the back surface 64 is sized and arranged to cooperate with and abut the front surface 14 of the toy figurine first part 10. The inner surface 75 of the side surface 65 is sized and arranged to cooperate with and abut the side surface 15 of the toy figurine first part 10. The inner surface 76 of the side surface 66 is sized and arranged to cooperate with and abut the side surface 16 of the toy figurine first part 10.

Preferably, a centrally arranged opening 68 is provided in and extending through bottom wall 62 of the toy figurine first part 10. The opening 68 has a rim 69.

The opening 68 and rim 69 may, as also discussed above, form the second connection means 80, such that the opening 68 and rim 69 are configured to cooperate with the four studs or pegs 31, 32, 33, 34.

As shown in FIGS. 1-6, in an embodiment the toy figurine second part 60 comprises a set of legs 77. Each of the two legs 77 extends downward from the bottom wall 62 of the shell 60'. At a lower end of each leg 77 a structure resembling a foot 78 is arranged. Each foot 78, has bottom edge 79. The bottom of edge of each foot 78 is defines a plane. Thereby, the toy figurine second part 60 may rest on planar surfaces such as floors or tables.

Preferably, sixth connection means 45, are formed in a lower surface of the feet 78 to allow the user to couple/connect the toy figurine second part 60 (and thereby the toy figurine 5, when the toy figurine first part 10 is connected to the second part 60) to a toy construction element 300, having fifth connection means 40, e.g. as described above, or to another toy figurine 5, having fifth connection means 40. Preferably, the sixth connection means 45 at the lower surface of the feet are one or more indentions 47 similar to (of the same type as) the indentations 46 in the toy building block 310 described in connection with FIG. 9 above, adapted to cooperate to knobs 41, 42, 43, 44 as also described above.

In further embodiments, fifth connection means 40 may be provided on the shell 60' the toy figurine second part 60 on the outer surface thereof, the fifth connection means 40 being configured to be connected to sixth connection elements 45 on another toy construction element, for example as described above in connection with FIG. 9. As shown in e.g. FIGS. 2, 4A, 4B, 4D, 4E, 5A two such fifth connection means 40 may be arranged, spaced apart on the front surface 63 of the toy figurine second part 60, and in the form of knobs 43 protruding from the front surface 63. Apart from enabling connection of the toy figurine second part 60 to another toy construction element 310, 320, the knobs 43 may be located in a position to resemble buttons on a set of overalls/pants or decorations or on a set of braces/suspenders or the like.

As mentioned above, and as shown in e.g. FIGS. 2 and 6, the inner side surfaces 75, 76 are each provided with fourth connection means 81 in the form of a horizontally oriented elongate indention/depression configured for cooperating with the fifth connection means 35 formed as an elongate flange protruding from each of the side surfaces 15, 16. By a resilience of the shell 60', the cooperating fifth and sixth connection means between them form a releasable snap connection allowing the toy figurine first and second parts 10, 60 to be releasably connected to each other.

As mentioned above, and as shown in e.g. FIGS. 2 and 6, second connection means 80 are provided in the toy figurine second part 60 for receiving and cooperating with the above mentioned first connection means 30 provided at the bottom surface 12 of the toy figurine first part 10. As described above the first connection means 30 may be provided as connector studs 31, 32, 33, 34 protruding downwards from the bottom surface 12 of the toy figurine first part 10. The second connection means 80 are preferably the rim 69 of the opening 68 through the bottom surface 62, 72 of the toy figurine second part 60 shell 60'.

It will be appreciated that the inner space 67 of the shell 60' of the toy figurine second part 60 is dimensioned such that the toy figurine first part 10 or at least a lower portion thereof is insertable into the inner space 67 of the toy figurine second part 60. Thereby, the inner front surface 73 of the toy figurine second part 60 abuts on the front surface 13 of the toy figurine first part 10.

Further, the inner back surface 74 of the toy figurine second part 60 abuts on the back surface 14 of the toy figurine first part 10. Further, the inner side surface 75 of the toy figurine second part 60 abuts on the side surface 15 of the toy figurine first part 10. Further, the inner side surface 76 of the toy figurine second part 60 abuts on the side surface 16 of the toy figurine first part 10. And further, the inner bottom surface 72 of the toy figurine second part 60 abuts on the lower/bottom surface 12 of the toy figurine first part 10.

As shown in FIGS. 1-6, in one embodiment, when the toy figurine first part 10 is inserted into, and connected to, the toy figurine second part 60, the toy figurine second part 60 extends to cover the lower portion resembling a body 18 of the housing 10' of toy figuring first part 10, such that the upper rim/edge 61 of the toy figurine second part 60 extends up to the circumferential indentation 19 resembling a neck 19 of the toy figurine 5.

Thus, when the toy figurine first part 10 is inserted into, and connected to, the toy figurine second part 60, the front surface 63 of the toy figurine second part 60 extends to cover the lower portion resembling a body 18 of the housing 10' of toy figuring first part 10, such that the upper rim/edge 61 of the toy figurine second part 60 extends up to the circumferential indentation 19 resembling a neck 19 of the toy figurine 5 at the front surface 13 of the toy figuring first part 10.

Thus, when the toy figurine first part 10 is inserted into, and connected to, the toy figurine second part 60, the back surface 64 of the toy figurine second part 60 extends to cover the lower portion resembling a body 18 of the housing 10' of toy figuring first part 10, such that the upper rim/edge 61 of the toy figurine second part 60 extends up to the circumferential indentation 19 resembling a neck 19 of the toy figurine 5 at the back surface 14 of the toy figuring first part 10.

Thus, when the toy figurine first part 10 is inserted into, and connected to, the toy figurine second part 60, the side surfaces 65, 66 of the toy figurine second part 60 extends to cover the lower portion resembling a body 18 of the housing 10' of toy figuring first part 10, such that the upper rim/edge 61 of the toy figurine second part 60 extends up to the circumferential indentation 19 resembling a neck 19 of the toy figurine 5 at the respective side surfaces 15, 16 of the toy figuring first part 10.

However, in order to allow the toy figurine second part 10 to be inserted into the inner space 67 of the toy figurine second part 60 cut-outs 85, 86 are provided in the respective side surfaces 65, 66 of the toy figurine second part 60, the cut-outs extending downwards from the upper/top rim 61 of the shell 60'.

In some embodiments, and as shown in e.g. FIG. 2, a digital screen 110 is preferably provided at the upper part of the portion of the toy figurine first part 60 resembling a body 18. The digital screen is electronically connected to receive instruction from a (not shown) processor arranged within the toy figurine first part 10.

Figure 5A:
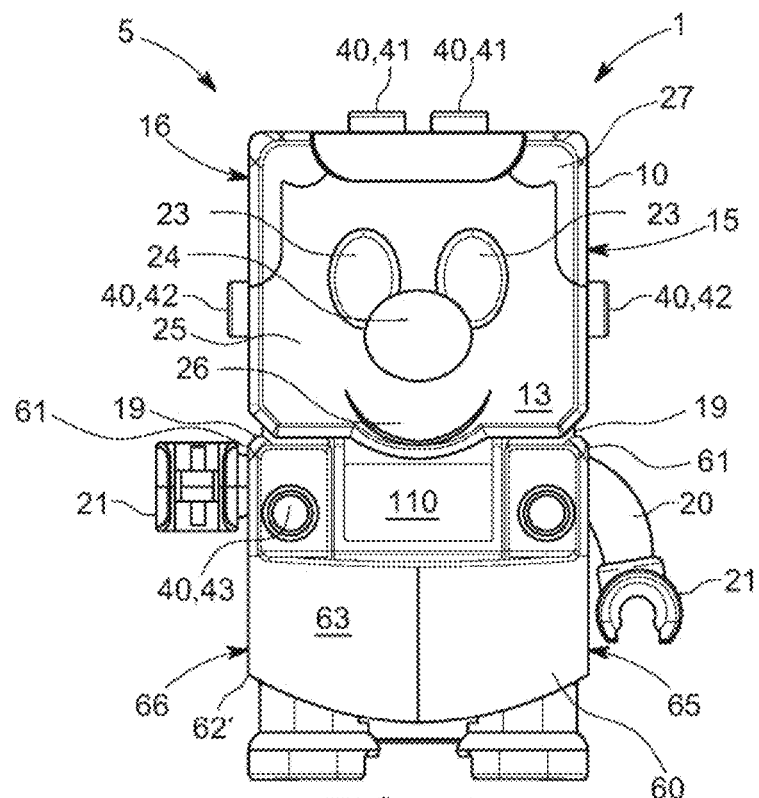
FIG. 5A, in a front view, shows a first and a second part of the toy figurine in FIGS. 1 and 2 in an assembled state.
Figure 5B:
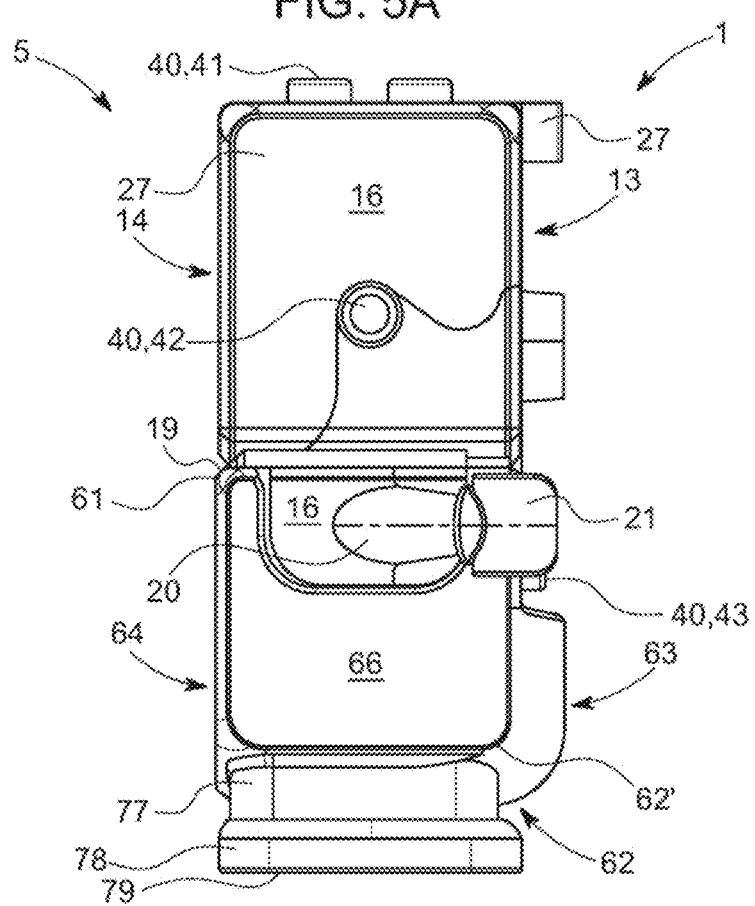
FIG. 5B is a side view of the assembled toy figurine of FIG. 5A.

A cut-out 83 in the front surface 63 of the toy figure second part 60 is provided to allow visual inspection of the digital screen 110 on the front surface 63 of the toy figure first part 60, when the toy figurine second part 60 is connected to the toy figurine first part 10. FIGS. 1 and 5A shows the assembled toy figurine 5 from the front, when the toy figurine second part 60 is connected to the toy figurine first part 10. From these it is clear that the cut-out 83 is dimensioned and located such that the digital screen 110 is visibly even though the toy figurine second part 60 is connected to and covering a lower portion of the toy figurine first part 10.

In some embodiments, and as shown in e.g. FIGS. 3C and 4C an on/off bottom 220 for turning electronic functions of the toy figurine 5 on or off. The button 220 may be a regular push button. The button 220 is preferably provided in the upper portion resembling a body 18 of the housing 10' adjacent to the neck 19, and at the back surface 14 of the toy figure first part 10.

In some embodiments, and as shown in e.g. FIGS. 3C and 4C communication window 230, e.g. an optical input device may additionally or alternatively be provided in the upper portion resembling a body 18 of the housing 10' adjacent to the on/off button 220 or the neck 19, and at the back surface 14 of the toy figure first part 10. The communication window 230 is configured for receiving instructions wirelessly from an external device such a cell phone, a tablet, a PC or the like.

Figure 5C:
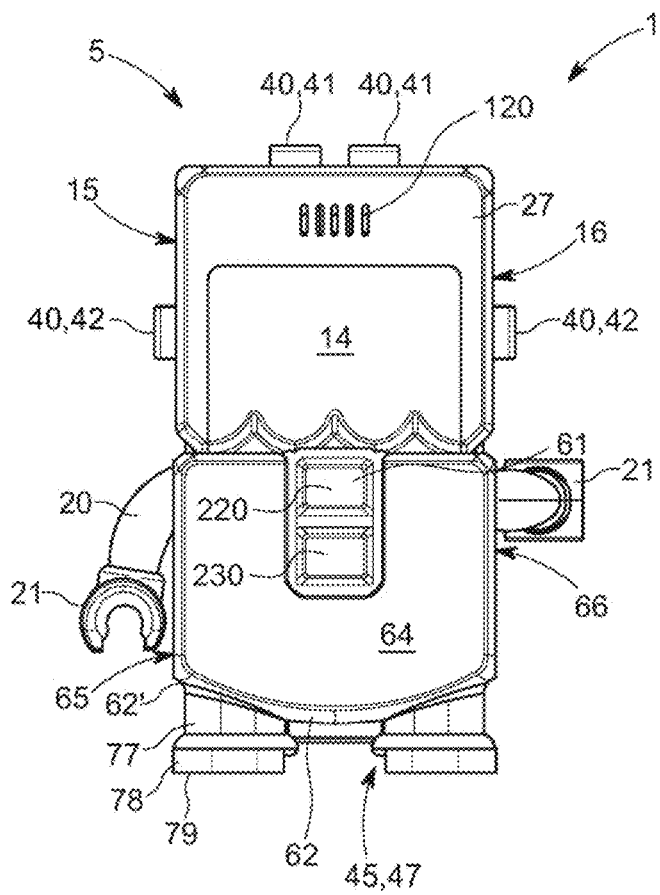
FIG. 5C is rear view of the assembled toy figurine of FIG. 5A.

A cut-out 84 in the back surface 64 of the toy figure second part 60 is provided to allow physical access to the button 220 and visual access to the communications window 230 on the back surface 64 of the toy figure first part 60, when the toy figurine second part 60 is connected to the toy figurine first part 10. FIG. 5C shows the assembled toy figurine 5 from the back, when the toy figurine second part 60 is connected to the toy figurine first part 10. From this it is clear that the cut-out 84 is dimensioned and located such that the button 220 and/or the communication window 230 accessible even though the toy figurine second part 60 is connected to and covering a lower portion of the toy figurine first part 10.

As shown in FIG. 3C and FIG. 5C, the toy figurine first part may—in embodiments—be provided with a loudspeaker 120. The loudspeaker 120 may—as shown in the mentioned figures be provided at the back surface 14 adjacent to the upper end 11' of the toy figurine first part 10.

Figure 3E:
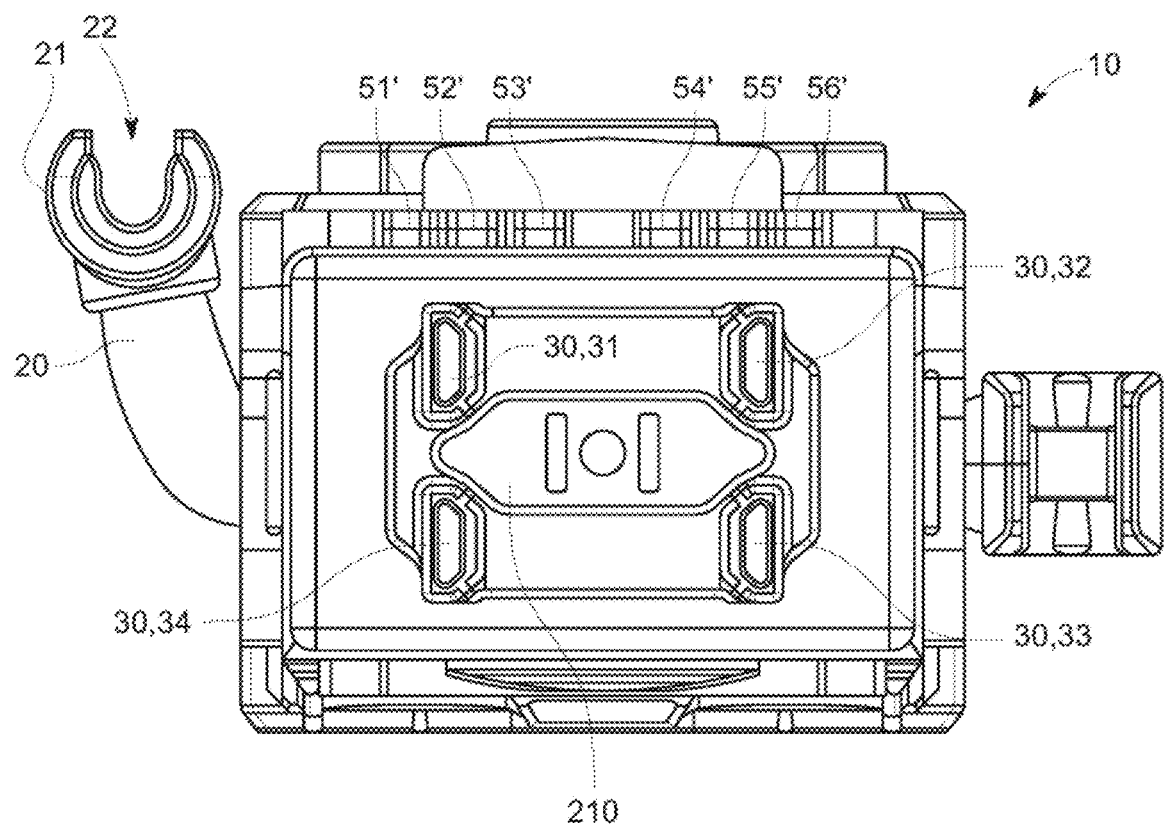
FIG. 3E is a bottom view of the first part of the toy figurine of FIG. 3A.
Figure 5D:
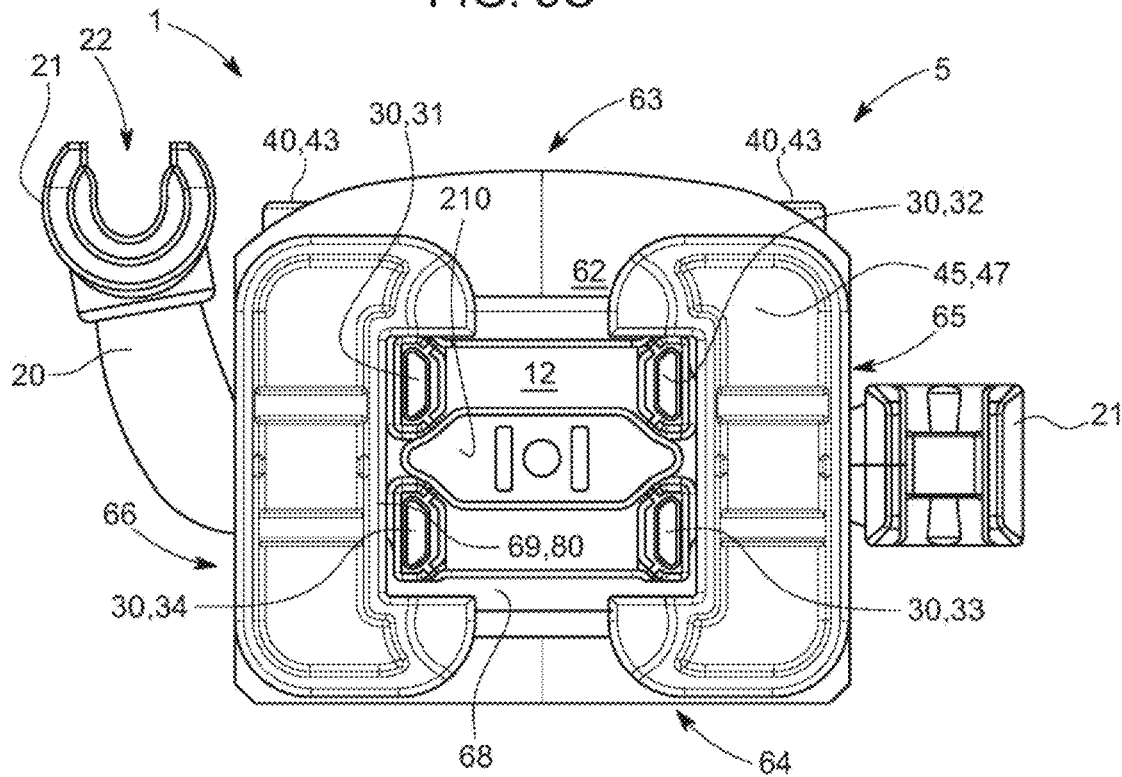
FIG. 5D, in a bottom view, shows the assembled toy figurine of FIG. 5A.

In some embodiments, and as shown in FIGS. 3E, 5D, the toy figurine 5 may comprise a reader 210 for detecting markers. As shown in FIG. 3E such a reader 210 may be located in the bottom surface 62 between the connection studs 31, 32, 33, 34. When the toy figurine first part 10 is not connected to toy figurine second part 60, the studs 31, 32, 33, 34 protect the reader 220 from direct contact with it's surroundings. When on the other hand, the toy figurine first part 10 is connected to toy figurine second part 60, the legs 77 and feet 78 aids the studs 31, 32, 33, 34 in protecting the reader 220 from direct contact with it's surroundings. The reader 22, located at the bottom surface 62 of the toy figurine first part 10 is aligned with the opening 67 through the bottom wall 62. Thereby, the reader 210 may read markers also when the first part 10 is connected to the second part 60. This may be appreciated from FIG. 5D.

As shown in FIGS. 2 and 3B, the toy figurine first part 10 comprises a slanted surface 13' at lower end 12' of the front surface 13 of toy figurine first part.

A set of contacts or switches 50' are formed in cut-outs 50 in the slanted surface 13' of the front surface 13 of toy figurine first part 10. The reference 51 designates a first cut-out in the slanted surface 13'. The reference 52 designates a second cut-out in the slanted surface 13'. The reference 53 designates a third cut-out in slanted surface 13'. The reference 54 designates a fourth cut-out in the slanted surface 13'. The reference 55 designates a fifth cut-out in the slanted surface 13'. The reference 56 designates a sixth cut-out in slanted surface 13'.

The cut-outs 51, 52, 53, 54, 55, 56 protect the contacts/switches 50' from unintentional activation.

As shown in FIGS. 4D and 6, the toy figure second part 60 comprises a number of contact pegs 90 formed in the lower part of the inner front surface 73 of the toy figurine second part 60.

A first contact peg 91 is aligned with the first cut-out 51 in the slanted surface 13' of the front surface 13 of toy figurine first part 10. A second contact peg 92 is aligned with the second cut-out 52 in the slanted surface 13' of the front surface 13 of toy figurine first part 10. A third contact peg 93 is aligned with the third cut-out 53 in the slanted surface 13' of front surface 13 of the toy figurine first part 10. A fourth contact peg 94 is aligned with the fourth cut-out 54 in the slanted surface 13' of the front surface 13 of the toy figurine first part 10. A fifth contact peg 95 is aligned with the fifth cut-out 55 in the slanted surface 13' of the front surface 13 of toy figurine first part 10. A sixth contact peg 96 is aligned with the sixth cut-out 56 in the slanted surface 13' of the front surface 13 of the toy figurine first part 10.

As shown in FIG. 6, there are six contact pegs 90. This corresponds to the six cut-outs 51, 52, 53, 54, 55, 56 each protecting a switch 50', such that the toy figurine first part has six switches 51', 52', 53', 54', 55', 56' as shown in e.g. FIG. 2 and FIG. 3E.

In the embodiment shown in FIG. 6, the first contact peg 91 and the sixth contact pegs 96 extend further outwards and upwards than the second 92, third 93, fourth 94 and fifth 95 contact pegs. The first contact peg 91 and the sixth contact pegs 96 are thereby configured to push/contact the first switch 51' in the first cut-out 51 and the sixth switch, 56' in the sixth cut-out 56, when the first and second parts 10, 60 are connected with each other. Thereby, the first and sixth switches may be activated. The remaining contact pegs, i.e. the second 92, third 93, fourth 94 and fifth 95 contact pegs have a cut-off profile. Therefore, they do not touch/contact the second 52', third 53', fourth 54' and fifth 55' switches, why these are not activated. Thus, there are two types of contact pegs 90, those that activate a switch 50' and those that don't activate a switch 50', when the toy figurine first part 10 and the toy figurine second part 60 are connected.

It will be appreciated that the above described pattern of contact pegs 90 that activate a switch 50' (first and sixth contact pegs 91, 96) and those that do not (second 92, third 93, fourth 94 and fifth 95 contact pegs) may be varied. With the six contact pegs 90 and six switches 50' as shown, there are $2^6$ combination possibilities of contact pegs 90 that activate a switch 50', and those that do not.

We note that the contact pegs 90 not being configured for contacting switches 50', may be omitted completely, a void being located at the position opposite the corresponding cut-out 50 and switch 50'.

As mentioned above, the toy figurine 5 comprises a processor. The switches 50' are electronically connected to the processor.

Stored in a memory associated with the processor, is plurality of profile "personalities" or behavioral patterns associated with the character, which the toy figurine is supposed to resemble. For example the toy figurine 5 shown in FIGS. 1-6 may have behavioral patterns resembling a pirate, a fireman/woman, a police man/woman, a Santa Claus, a ghost, a mechanic, an outdoorsman/woman, a construction worker, a pilot, a burglar and so on. Various sounds, voices, comments, sounds sound bits, music tunes, light emissions, flash pattern, etc. may be associated with each of the behavioral patterns, and be played e.g. in response to an event such as a sensor input by the loudspeaker 120. Such a sensor input may be a detection of a specific movement, where a "pirate behavior pattern" may cause playing of a roar in response to the detection of the specific movement, and a "ghost behavior pattern" will be cause the playing of an evil laughter in response to the detection of the same specific movement.

Activating a subset of the switches 50' may set the behavior pattern of the toy figurine 5. Any of the combinations of contact pegs 90 may be associated with a behavioral pattern as exemplified above. With the six contact pegs 90 and six switches 50' as shown, there are $2^6$ possible behavioural patterns possible.

Thereby, if the toy figurine second part 60 has one combination of contact pegs, the toy figurine 5 comprising that toy figurine second part 60 and a toy figurine first part 10 may show one behaviour pattern, for example a "pirate" behavioural pattern. If the same toy figurine first part 10 is connected to another toy figurine second part 60 having a different combination of contact pegs 90, the toy figurine may show another behaviour pattern, for example a "burglar" behavioural pattern.

A toy system 1 according to the disclosure comprises at least one toy figurine first part 10 having two or more switches 50' and at least one toy figurine second part 60 having the same number of contact pegs 90 and/or voids. In further embodiments, the toy system 1 comprises at least one toy figurine first part 10 having two or more switches 50' and two or more toy figurine second parts 60 having the same number of contact pegs 90 and/or voids.

In yet further embodiments, the toy system 1 further comprises one or more toy construction elements 300 attachable to the toy figurine 5, for example via fifth connection means 40 formed on the toy figurine 5. Yet further embodiment of the toy system 1, the toy system additionally or alternatively comprises one or more toy construction elements 300, 341, 342, 343, 344, 345, 346, 347, 348, at least a subset of which comprises markers 330, 331, 332, 334, see e.g. FIG. 11, the toy construction elements 341, 342, 343, 344, 345, 346, 347, 348 forming part of a physical play environment 350 constructed from the toy construction elements 300, see below.

The toy figurine 5 may comprise an accelerometer (not shown) or similar sensor and a camera, a color sensor or other reader for reading a marker. The reader 210 is configured to face downwards, i.e. to detect a marker onto which the toy is positioned. The toy further comprises a display 110 and a loudspeaker 120 for providing visual and audible feedback responsive to detected movements of the toy and to detected markers as described in relation to the toy system 1 below.

Figure 11:
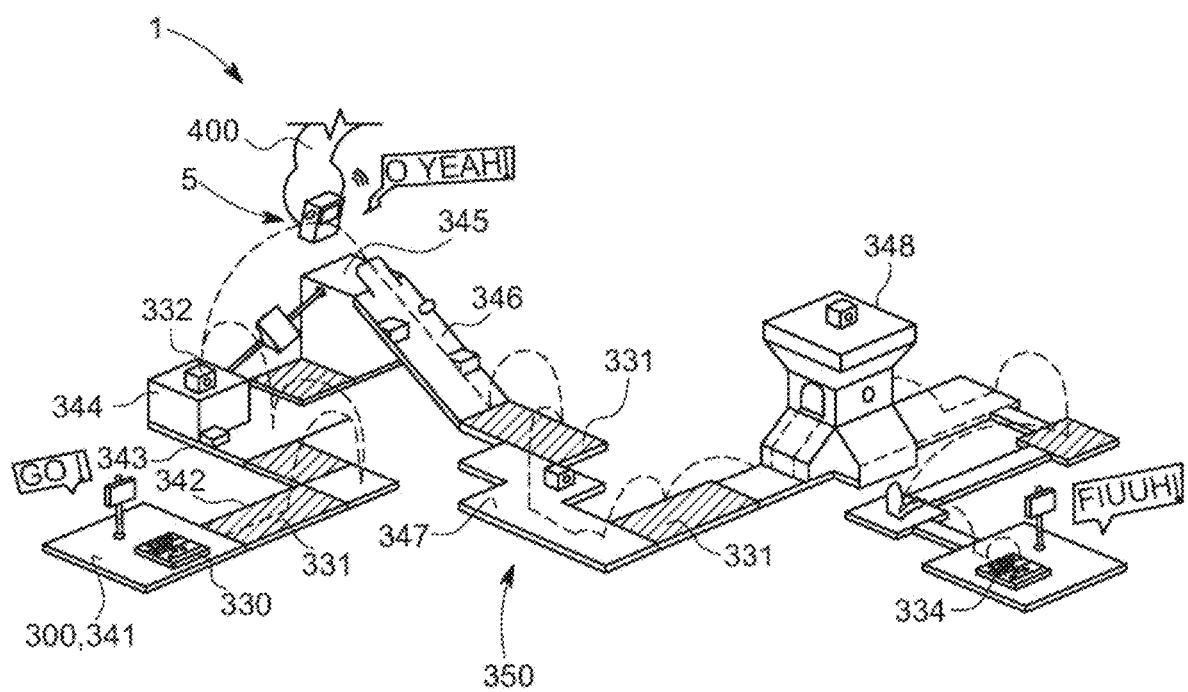
FIG. 11, in a perspective view, shows a two part toy figurine in a setting of toy construction elements, the setting and two part toy figurine forming part of a toy system according to an aspect of the disclosure.

FIG. 11 illustrates an example of a toy system 1 comprising a physical play environment 350 constructed from toy construction elements 300. The toy system further comprises a toy figurine 5 which a user 400 can move about the physical play environment. The toy figurine 5 may the toy figurine 5 in any of the embodiments described above. The toy figurine 5 may further comprise an accelerometer (not shown) for detecting movements of the toy figurine 5 and an optical reader 210 configured to detect different types of markers: One type of marker 332 may include a visible code, such as a microdot pattern, a QR code or the like; while other markers 331 may be colored tiles or other colored toy construction elements 300. However, it will be appreciated that other types of markers, such as visible markers, RFID markers, etc., may be used. The toy figurine 5 resembles a character. In this example, the reader 220 is facing downwards, i.e. configured to detect markers onto or above which the toy is placed.

The user 400 initiates a play activity by holding the toy in contact or close proximity to a start marker 330. Responsive to detecting the start marker 330, the toy figurine 5 may enters an active play mode. In some embodiments, the toy system 1 includes different start markers 330, each indicative of a respective play activity. Alternatively or additionally, different play activities may be selected based on other criteria, e.g. a user input to the toy, communication with another toy figurine or with a processing device, based on previously completed play experiences, a progression level of the toy figurine, etc. A progression level may e.g. be stored by the toy figurine 5 and/or by a remote processing device (not shown) with which the toy figurine 5 is communicatively connected.

While in the active play state, the toy figurine 5 detects movements of the toy figurine 5 and it detects one or more markers 331, 332, e.g. toy construction elements having predetermined color(s) or other visual markers, when the toy figurine 5 is brought in proximity of said markers.

When the toy detects a finish marker 334, the toy exits the active play state and may compute a score which depends on the movements and markers that have been detected while the toy was in the active play state. It will be appreciated that the score may be computed and updated in real time while the toy is in its active play state or it may be computed once the toy has exited the active play state.

The computation of the score may be based on a set of game rules where different play activities may have different game rules associated with them. The game rules may thus be store by the toy figurine and/or by a remote processing device (not shown) with which the toy figurine 5 is communicatively connected.

The computation of the score may further depend on one or more other parameters, such as an elapsed time between detection of the start marker and detection of the finish marker, on any recognized accessories attached to the toy and/or the like.

In some embodiments, the toy system 1 may comprise a processing device not shown), such as a smartphone, a tablet computer or another type of computer, another electronic toy, such as another toy figurine similar to toy figurine 5, etc. The toy figurine 5 may be configured to wirelessly communicate with the processing device 150, thus allowing the processing device to provide a digital play experience corresponding to the movements and detected tags by the toy figurine 5. The processing device may also be used to maintain usage data, e.g. game progression data etc. Moreover, the processing device may be used to allow the user to select different types of game experiences.

The sensors 200 included in the toy figurine 5 allows the integrated processor to detect various types of movement and/or impacts when the toy figurine touches a surface of the physical play environment 350. The toy figurine may then create audible and/or visible feedback responsive to the detected movements/impacts and dependent on the selected behavior pattern, selected by the choice of toy figurine second part.

FIG. 7 illustrates yet another example of a toy system 1 comprising a toy figurine 5. The toy figurine 5 may be a toy figurine 5 as described above. In this case the toy figurine 5 is attachable to an accessory toy construction element 360, in the figure shown as a vehicle, such as a toy car. In this case the toy construction element 360 comprises a space 361 for receiving the lower part of the toy figurine 5. A bottom surface of this space 361 may in this case comprise a marker 333 identifiable by the reader 210 in the toy figurine 5. The toy figurine may then create audible and/or visible feedback responsive to the detected marker 333 and dependent on the selected behavior pattern, selected by the choice of toy figurine second part 60. When the combined toy figurine 5 and car 360 moves, the movements and eventually impacts detected by the sensors 200 may then create audible and/or visible feedback responsive to the detected movement and/or impacts, and dependent on the selected behavior pattern, selected by the choice of toy figurine second part 60.

FIG. 8 illustrates yet another example of a toy system 1 comprising a toy figurine 5. In this case, the toy figurine 5 is attachable to an accessory toy construction element 370, in the figure shown as a vehicle, such as a skateboard comprising a marker 333 identifiable by the reader 210 in the toy figurine 5. FIG. 8 further shows that the toy figurine 5 may attached to another accessory toy construction element 370, in the figure shown as a vehicle, such as a jet pack, the jet pack comprising a marker 333 identifiable by the reader 210 in the toy figurine 5.

FIG. 9 illustrates an embodiment of a toy figurine 5 comprising a toy figurine first part 10, which may be formed as described in connection with FIGS. 1-6 above. However, in this case a toy figurine second part 60 may be shaped as a vehicle, such as a toy car. The toy figurine second part 60 is provided with an internal space 67 configured for receiving the lower part of the toy figurine first part 10 basically as described in connection with FIGS. 1-6 above. A bottom surface of the toy figurine second part 60 is provided with contact pegs as described in connection with FIGS. 1-6 above.

It is to be noted that the figures and the above description have shown the example embodiments in a simple and schematic manner. Many of the specific mechanical details have not been shown since the person skilled in the art should be familiar with these details and they would just unnecessarily complicate this description.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., connection elements, mating elements, contact pegs, voids, spaces, surfaces and the like) shown as distinct for purposes of illustration may be incorporated within other functional elements in a particular implementation.

Further, although the subject technology has been described with respect to the field of a particular toy figurine, it is envisioned that the subject technology would be equally applicable to other fields and applications such as any connection elements.

LIST OF PARTS

1 System
5 toy figurine
10 toy figurine first part
10' housing
11 top/upper surface of toy figurine first part
11' top/upper end of toy figurine first part
12 bottom/lower surface of toy figurine first part
12' bottom/lower end of toy figurine first part
13 front surface of toy figurine first part
13' slanted surface of front surface of toy figurine first part
14 back/rear surface of toy figurine first part
15 side surface of toy figurine first part
16 side surface of toy figurine first part
17 head
18 body
19 neck/circumferential indentation
20 arm
21 hand
22 connector
23 eye
24 nose
26 mouth
27 hair relief
30 first connection means on the toy figurine first part, configured for cooperating with second connection means on the toy figurine second part
31 connector stud or peg/resilient connector on the toy figurine first part
32 connector stud or peg/resilient connector on the toy figurine first part
33 connector stud or peg/resilient connector on the toy figurine first part
34 connector stud or peg/resilient connector on the toy figurine first part
35 third connection means/elongate connecting flange formed on the toy figurine first part, configured for cooperating with fourth connection means on the toy figurine second part
40 fifth connecting means/knob
41 connecting means/knob on top/upper surface of first of toy figurine first part
42 connecting means/knob on side surface of first of toy figurine first part
43 connecting means/knob on front surface of first of toy figurine second part
44 connecting means/knob on top/upper surface of building block
45 sixth connecting means/indentations
46 connecting means/indentation in bottom of a toy building block
47 connecting means/indentation formed in the bottom of a foot of the toy figurine second part
50 cut-out for a switch/cut-out formed in slanted surface of front surface of toy figurine first part 51 first cut-out in slanted surface of front surface of toy figurine first part
52 second cut-out in slanted surface of front surface of toy figurine first part
53 third cut-out in slanted surface of front surface of toy figurine first part
54 fourth cut-out in slanted surface of front surface of toy figurine first part
55 fifth cut-out in slanted surface of front surface of toy figurine first part
56 sixth cut-out in slanted surface of front surface of toy figurine first part
50' switch/electrical contact formed in cut-out in slanted surface of front surface of toy figurine first part
51' switch
52' switch
53' switch
54' switch
55' switch
56' switch
60 toy figurine second part
60' shell of toy figurine second part
61 top edge of toy figurine second part
62 bottom/lower wall of toy figurine second part
62' bottom/lower end of toy figurine second part
63 front surface of toy figurine second part
64 back/rear surface of toy figurine second part
65 side surface of toy figurine second part
66 side surface of toy figurine second part
67 internal space of toy figurine second part
68 opening through bottom wall of toy figurine second part
69 rim of opening in bottom surface of the toy figurine second part 72 internal surface of bottom wall of toy figurine second part
73 internal surface of front surface of toy figurine second part
74 internal surface of the back/rear surface of toy figurine second part
75 internal surface of side surface of toy figurine second part
76 internal surface of side surface of toy figurine second part
77 leg
78 foot
79 bottom edge of foot
80 second connection means formed on the toy figurine second part and configured for cooperating with the first connection means on the on the toy figurine first part
81 fourth connection means, e.g. an elongate depression formed in inner side surface of the toy figurine second part.
83 cut-out in front surface of toy figure second part allowing visual inspection of a digital screen on the front surface of the toy figure first part
84 cut-out in back surface of toy figure second part allowing access to buttons etc. on the back surface of the toy figure first part
85 cut-out in side surface of toy figure second part allowing the arms extending from the side surface of the toy figure first part to extend out of the shell of the toy figure second part
86 cut-out in side surface of toy figure second part allowing the arms extending from the side surface of the toy figure first part to extend out of the shell of the toy figure second part
90 contact pegs formed in the lower part of the inner front surface of the toy figurine second part.
91 first contact peg aligned with first cut-out in slanted surface of front surface of toy figurine first part
92 second contact peg aligned with second cut-out in slanted surface of front surface of toy figurine first part
93 third contact peg aligned with third cut-out in slanted surface of front surface of toy figurine first part
94 fourth contact peg aligned with fourth cut-out in slanted surface of front surface of toy figurine first part
95 fifth contact peg aligned with fifth cut-out in slanted surface of front surface of toy figurine first part
96 sixth contact peg aligned with sixth cut-out in slanted surface of front surface of toy figurine first part
100 electronic output devices/components
110 digital screen
120 loudspeaker
200 sensors
210 readers for detecting markers
220 on/off bottom
230 communication window, e.g. for optical input
300 toy construction element
310 toy building block
311 side wall of toy building block
312 cylindrical protrusion
320 hat
330 start marker
331 one type of marker
332 another type of marker
333 marker
334 end marker
341, 342, 343, 344, 345, 346, 347, 348 toy construction elements of a physical play environment
350 physical play environment
360 toy construction element, car
370 toy construction element, skateboard
380 toy construction element, jet pack
400 user.

What is claimed is:

1. A toy figurine comprising:
a toy figurine first part resembling an upper body of a character extending between a distal top surface and a proximal bottom surface, the toy figurine first part comprising:
connecting protrusions on the proximal bottom surface; and a reader for detecting markers in a proximity of the toy figurine;
a toy figurine second part resembling a lower body part of the character and forming a shell having an inner space configured for receiving the toy figurine first part, the toy figurine second part defining complementary openings to the connecting protrusions of the toy figurine first part, the toy figurine first part and the toy figurine second part together forming a complete character of the toy figurine when connected to each other; and
a switch system comprising:
an array of switches formed in the toy figurine first part,
an array of contact pegs in the inner space configured for alignment with the array of switches, the quantity of contact pegs equating to the quantity of switches, the array of contact pegs including at least one peg with a cut-off profile such that when the toy figurine first and second parts are connected to each other via the connecting protrusions and complementary openings, the peg with the cut-off profile fails to contact a switch to form a pattern of switch engagement; and
a processor comprising a memory in which a number of character behaviour patterns are stored, the processor electronically connected to at least one electronic output component, the reader and to the array of switches, wherein the processor, depending on the pattern of switch engagement and depending on which marker is detected by the reader, is configured to: select a character behaviour pattern; and use the character behaviour pattern to determine sound or visual outputs from the at least one electronic output component,
wherein the reader is formed in the proximal bottom surface of the toy figurine first part between the connecting protrusions so that the connecting protrusions protect the reader from contact with the marker, and wherein an opening is defined by a bottom wall of the shell of the toy figurine second part so that the opening aligns with a field of view of the reader so that when the marker is placed in front of the opening, the reader is configured to read said marker.

2. The toy figurine according to claim 1, wherein: the array of switches comprises six switches formed along a line; the array of contact pegs comprises x contact pegs formed along a line so that each contact peg activates one switch of the array of switches; x belongs to an interval of integers between 0 and 6; the array of contact pegs comprises y cut-off profile contact pegs which fail to contact a switch; y belongs to an interval of integers between 0 and 6; and x+y=6.

3. The toy figurine according to claim 1, wherein the toy figurine first part comprises a sensor for detecting movement of the toy figurine, wherein the sensor is electronically connected to the processor, and wherein the processor is configured for providing a sound or visual output in accordance with the character behaviour pattern via the at least one electronic output component in response to a movement of the toy figurine sensed by the sensor.

4. The toy figurine according to claim 1, wherein: the toy figurine first part has a slanted surface for banking against the toy figurine second part to guide the toy figurine first part into the lower body part; and the slanted surface forms an array of openings aligned with the array of switches to allow access to and protect the array of switches from unintentional actuation.

5. A multi-part figurine comprising:
a figurine head;
a figurine body configured for cooperating with the figure head;
a switch system comprising:
  an array of switches formed in the figurine head,
  an array of contact pegs in the figurine body configured for alignment with the array of switches, the quantity of contact pegs equating to the quantity of switches, the array of contact pegs including at least one peg with a cut-off profile such that when the figurine head and body are connected to each other, the peg with the cut-off profile fails to contact a switch;
at least one electronic output component;
a sensor for detecting movement of the toy figurine;
a processor comprising a memory in which a number of character behaviour patterns are stored, the processor electronically connected to the at least one electronic output component, the sensor, and to the array of switches, the processor, depending on which switches are contacted by the contact pegs and in response to movement of the multi-part figurine being sensed by the sensor, configured to select a character behaviour pattern and configured for using the character behaviour pattern to provide sound or visual outputs via the at least one electronic output component;
a reader coupled to the figurine body and in communication with the processor; and
a playscape including a starter marker, a plurality of intermediate markers, and a finish marker, each marker configured to be read by the reader,
wherein: the starter marker being read creates an active play mode of the multi-part figurine indicating a play activity matched to the selected character behaviour pattern; and the plurality of intermediate markers being read creates a progression level stored in the memory.

6. The multi-part figurine of claim 5, wherein upon connection of the figurine head with the figurine body, the processor is configured to actuate the multi-part figurine to exhibit one of the character behaviour patterns stored in the memory unit.

7. The multi-part figurine of claim 5, wherein:
the figurine head further comprises a plurality of cut-outs housing the array of switches therein; and
upon actuation of a combination of the switches, the processor is configured to actuate the multi-part figurine to exhibit one of the character behaviour patterns stored in the memory unit.

8. The multi-part figurine of claim 5, wherein the figurine head defines a connector peg on an exterior surface thereof, and the figurine body defines a complimentary port in an interior surface thereof for receiving the connector peg.

9. An interactive toy system comprising:
an upper body part having three switches for generating a switch pattern signal;
a first lower body part representing a first character and configured to couple with the upper body part so that the upper body part and the first lower body part form a first figurine, the first lower body part having at least one protrusion configured to selectively activate at least one of the three switches;
a sensor coupled to one of the upper body part or the first lower body part for generating a sensor signal;
an output element coupled to one of the upper body part or the first lower body part;
a control module in the upper body part, the control module including: memory storing an instruction set and data related to a plurality of behavioral patterns; and a processor for running the instruction set, the processor being in communication with the three switches, the sensor, the output element and the memory, wherein the processor runs the instruction set to be operative to select one of the behavioral patterns matching the first character for controlling the output element based upon: the switch pattern signal created from interaction between the at least one protrusion and the three switches when the upper body part and the first lower body part are coupled together; and the sensor signal created from interaction between the first figurine and a user;
a reader coupled to the upper body part and in communication with the processor; and
a playscape including a starter marker, a plurality of intermediate markers, and a finish marker, each marker configured to be read by the reader,
wherein: the starter marker being read creates an active play mode of the first figurine indicating a play activity matched to the selected one of the behavior patterns; and the plurality of intermediate markers being read creates a progression level stored in the memory.

10. The interactive toy system of claim 9, further comprising a second lower body part representing a second character different from the first character, the second lower body part being configured to couple with the upper body part to form a second figurine, the second lower body part having at least one protrusion configured to selectively activate at least one of the three switches to create another switch pattern signal for the processor so that the processor selects one of the behavioral patterns matching the second character.

11. The interactive toy system of claim 9, wherein: the upper body part has a face section with opposing side connectors that resemble ears; the first lower body part has a bottom connection portion that resembles feet; and the lower body part has a clothing section with a clothing connection portion that resembles buttons.

12. The interactive toy system of claim 9, wherein the at least one protrusion is three protrusions that provide structural reinforcement to the first lower body part and at least one of the three protrusions is relatively shorter so as not to activate the corresponding switch.

13. The interactive toy system of claim 12, wherein: the upper body part has a slanted surface for banking against the lower body part to guide the first upper body part into the lower body part; and the slanted surface forms three openings to protect and allow access to the three switches by receiving the three protrusions, respectively.

14. The interactive toy system of claim 9, wherein the finish marker being read has the processor create a computation score stored in the memory based upon interaction between the plurality of intermediate markers and the first figurine.

* * * * *